United States Patent
Morikawa

(10) Patent No.: US 7,477,249 B2
(45) Date of Patent: Jan. 13, 2009

(54) SHAPE PROCESSOR AND METHOD FOR REPRESENTING SHAPE

(76) Inventor: Naoto Morikawa, 27-22-1015, Sagamigaoka 1-chome, Zama-shi, Kanagawa 228-0001 (JP)

( * ) Notice: Subject to any disclaimer, the term of this patent is extended or adjusted under 35 U.S.C. 154(b) by 877 days.

(21) Appl. No.: 10/840,555

(22) Filed: May 5, 2004

(65) Prior Publication Data

US 2005/0007367 A1 Jan. 13, 2005

Related U.S. Application Data

(63) Continuation of application No. PCT/JP01/09695, filed on Nov. 6, 2001.

(51) Int. Cl.
*G06T 15/00* (2006.01)
(52) U.S. Cl. ...................................... 345/419
(58) Field of Classification Search ................ None
See application file for complete search history.

(56) References Cited

U.S. PATENT DOCUMENTS 5,625,378 A * 4/1997 Wan et al. .................... 345/600
5,825,369 A    10/1998 Rossignac et al. ........... 345/440
5,842,004 A *  11/1998 Deering et al. .............. 345/501

FOREIGN PATENT DOCUMENTS

JP          10-079049          3/1998

* cited by examiner

Primary Examiner—Kee M Tung
Assistant Examiner—Andrew Yang
(74) Attorney, Agent, or Firm—Edwards Angell Palmer & Dodge LLP; John J. Penny, Jr.

(57) ABSTRACT

A shape processor for processing an objective shape in a three-dimensional space while approximating, characterized by comprising an approximating section for generating a basic tile chain, i.e., a chain of basic tiles approximating the structure of the objective shape partially or entirely, by connecting the basic tiles of predetermined three dimensional shape having substantially tetrahedral shape including four vertexes sequentially starting with a starting point basic tile on the face of the basic tile.

18 Claims, 21 Drawing Sheets

230

| # | ID-OF-SHAPE | LATTICE POINTS | | | |
|---|---|---|---|---|---|
| | | x | y | z | |
| 1 | 001 | 0 | 0 | 0 | ···A |
| 2 | 001 | -1 | 1 | 0 | ···B |
| 3 | 001 | -1 | 2 | -1 | ···C |
| 4 | 001 | 0 | 2 | -2 | ···D |
| 5 | 002 | 0 | 2 | -2 | ···D |
| 6 | 002 | 2 | 3 | -3 | ···E |
| 7 | 002 | 2 | 1 | -1 | ···F |

| # | ID-OF-SHAPE | INITIAL | | | | TERMINAL | | | | CODE |
|---|---|---|---|---|---|---|---|---|---|---|
| | | x | y | z | TILE | x | y | z | TILE | |
| 1 | 001 | -1 | 2 | -1 | xy | -1 | 2 | -1 | xz | DUDDDUUUDUDDUU |
| 2 | 002 | 0 | 2 | -2 | xy | 0 | 2 | -2 | xz | DDDUDUUDDUDUUU |
| | | | | | | | | | | |
| | | | | | | | | | | |

FIG. 8

IN A THREE-DIMENSIONAL SPACE

IN A FOUR-DIMENSIONAL SPACE

A PLANE OF VERTICES $C_1, D_1$ AND $A_1$ COINCIDE WITH A PLANE OF VERTICES $A_2, B_2$ AND $D_2$

A PLANE OF VERTICES $C_1, D_1$ AND $B_1$ COINCIDE WITH A PLANE OF VERTICES $A_2, B_2$ AND $C_2$

AMINO-ACID

PROTEIN

| HORMONE (Insulin) chain-A 2HIU | | |
|---|---|---|
| | AMINO-ACID | CODE |
| 1 | GLY | |
| 2 | ILE | DUD |
| 3 | VAL | UUU |
| 4 | GLU | UDD |
| 5 | GLN | UUD |
| 6 | CYS | DUD |
| 7 | CYS | UUU |
| 8 | THR | UDD |
| 9 | SER | UUD |
| 10 | ILE | DDD |
| 11 | CYS | UUU |
| 12 | SER | DDD |
| 13 | LEU | DDD |
| 14 | TYR | UUD |
| 15 | GLN | DUD |
| 16 | LEU | UUU |
| 17 | GLU | UDD |
| 18 | ASN | UUU |
| 19 | TYR | UDD |
| 20 | CYS | UUU |
| 21 | ASN | UDD |

FIG. 19

SHAPE PROCESSOR AND METHOD FOR REPRESENTING SHAPE

The present application is a continuation application of PCT application No. PCT/JP01/09695 filed on Nov. 6, 2001, the contents of which are incorporated herein by reference.

BACKGROUND OF THE INVENTION

1. Field of the Invention

The present invention relates to shape processors and methods for representing shape.

2. Description of the Related Art

So far, as methods for representing the shape of an object in a three-dimensional space, there are two known methods.

One is the polygon mesh method which uses polygons to imitate the outline of an object and describe the shape by the vertices, edges and faces of the polygons used.

The other is the CSG (Constructive Solid Geometry) method which uses reference blocks, such as cuboids, spheres and cylinders, to imitates the shape. In the method the shape is represented as a set of the reference blocks.

In these methods, an object is decomposed into a set of components and the shape of the object is described by specifying the shape of the components and their positions. Thus, some objects may require a lot of computation for their decomposition. And some objects may require a large amount of data to describe the shape of the components and their positions, i.e., to describe their shapes. On the other hand, for example, in the field of chemistry, pharmacy and nano-technology, an efficient method to represent the structure of a polymer is required since the function of a polymer is often determined by its structure.

The present invention aims to reduce the amount of computation and data to represent the shape of an object.

SUMMARY OF THE INVENTION

In order to solve the foregoing problem, according to a first aspect of the present invention, there is provided a shape processor for imitating a shape of an object in a two-dimensional space, comprising: an approximation unit operable to generate a chain of basic tiles which imitates the shape of the object by connecting a basic tile with a following tile by an edge one by one from an initial tile, wherein the basic tile includes a predetermined set of basic tiles of two-dimensional shapes; and a generation unit operable to generate a three-dimensional shape by specifying whether each basic block is assigned to corresponding basic space, wherein the basic block are assignable to each basic space, which is the convex hull of eight points of a lattice in a three-dimensional space, and the basic block includes one reference vertex and division lines, wherein the reference vertex corresponds to a vertex which is shared by the predetermined three faces that are to be projected onto the predetermined two-dimensional plane simultaneously, and the division line corresponds to the line drawn from the reference vertex to its opposite vertex of the corresponding face, the generation unit corresponds to a part or all of the chain of the divided faces obtained by projecting the divided faces into the two-dimensional space, wherein the divided faces are divided by the corresponding division line from the face of one or more of the basic block(s) assigned in the basic space, assigns each of the basic blocks to the corresponding basic space, and generates a three-dimensional shape that corresponds to the shape of an object so that two adjacent basic tiles in the basic tile chain corresponds a part or all of shape obtained by projecting the divided-faces of one basic block or two consecutive basic blocks in the three-dimensional space into the two-dimensional space.

According to a second aspect of the present invention, there is provided a shape processor for imitating a shape of an object in a two-dimensional space, including a generation unit operable to generate three-dimensional shape defined by designating whether each basic blocks assignable to a basic space surrounded by eight points of a lattice in a three-dimensional space is to be assigned to the corresponding basic space, so that a two-dimensional shape, which is defined by projecting it into a direction where three faces of the basic block consisting of the three-dimensional shape may be seen, imitates the shape of the object, wherein the basic block is divided into two divided faces by a line connecting a reference vertex and a vertex positioned diagonally with respect to the reference vertex of the faces, wherein the reference vertex is a vertex shared by the three faces of the basic block, the generation unit executes: a first step of choosing one of the divided-faces of a basic block as the initial reference divided-face and one of the two edges of the initial reference divided-face that are edges of the corresponding basic block as the reference edge; a second step of choosing one of the two divided-faces which share the reference edge with the reference divided-face and whose image by the projection into the predetermined plane do not overlap with the image of the reference divided-face by the same projection, wherein the generation unit chooses the divided-face in such a way that the projection of the chosen divided-face imitates a part or all of the shape of the object; a third step of choosing the divided-face chosen in the second step as the new reference divided-face; and a fourth step of choosing the other edge of the new reference divided-face that is not the division line as the new reference edge, a chain of the divided-faces that were chosen as reference divided-faces during the execution is obtained by executing the steps from the second step to the fourth step repeatedly, the two-dimensional shape obtained by the projection of the chain into the predetermined plane imitates the shape of the object, and the generation unit generates a three-dimensional shape by assigning basic blocks that contains one of the divided-faces of the chain to their corresponding basic space.

The generation unit may choose a set of points of the lattice to generate a three-dimensional shape by assigning basic blocks to all of the basic spaces which correspond to triangular pyramids defined by the chosen points of the lattice, and the generation unit may further include an administration unit operable to keeps the generated shape as a set of points.

The generation unit may encode the generated shape by assigning a value 0 or 1 to each divided-faces of the chain according to the choice in the second step.

According to a third aspect of the present invention, there is provided a shape processor for imitating a shape of an object in a three-dimensional space, including: an approximation unit operable to generate a chain of basic tiles which imitates the shape of the object by connecting a basic tile with a following tile by an face one by one from an initial tile, wherein the basic tile includes a predetermined set of basic tiles of three-dimensional shapes; and a generation unit operable to generate a four-dimensional shape by specifying whether each basic block is assigned to corresponding basic space, wherein the basic block are assignable to each basic space, which is the convex hull of sixteen points of a lattice in a four-dimensional space, the basic block includes four hyperfaces projected into the three-dimensional space, each of the four hyperfaces of the basic block is divided into six division hyperfaces by a division face, which is a face including either of a reference vertex shared by the four hyperface of the basic block, a vertex positioned opposite from the reference vertex on the hyperfaces, or another vertex on the hyperfaces, the generation unit corresponds to a part or all of the chain of the divided hyperfaces obtained by projecting the divided hyperfaces into the three-dimensional space, wherein the divided hyperface are included by each of the hyperfaces of the basic block assigned in the basic space, assigns each of the basic blocks to the corresponding basic space, and generates a four-dimensional shape so that two adjacent basic tiles in the basic tile chain corresponds a part or all of shape obtained by projecting the divided-hyperfaces of one basic block or two consecutive basic blocks in the four-dimensional space into the three-dimensional space.

According to a fourth aspect of the present invention, there is provided a shape processor for imitating the shape of an object in a three-dimensional space, including a generation unit operable to generate four-dimensional shape defined by designating whether each basic blocks assignable to each basic space surrounded by sixteen points of a lattice in a four-dimensional space is to be assigned to the corresponding basic space, so that a three-dimensional shape, which is defined by projecting it into a direction where three hyperfaces of the basic block consisting of the four-dimensional shape maybe seen, imitates the shape of the object, wherein each of the hyperfaces of the basic block is divided into six divided hyperfaces by a division surface, which is a surface including either of a reference vertex which is a vertex shared by the four hyperfaces of the basic block projected into the projection direction, a vertex located opposite from the reference vertex on the hyperfaces, or another vertex on the hyperface, the generation unit executes: a first step of choosing one of the divided-hyperfaces of a basic block as the initial reference divided-hyperface and one of the two faces of the initial reference divided-hyperface that are faces of the corresponding basic block as the reference face; a second step of choosing one of the two divided-hyperfaces which share the reference face with the reference divided-hyperface and whose image by the projection into the predetermined plane do not overlap with the image of the reference divided-hyperface by the same projection, wherein the generation unit chooses the divided-hyperface in such a way that the projection of the chosen divided-hyperface imitates a part or all of the shape of the object; a third step of choosing the divided-hyperface chosen in the second step as the new reference divided-hyperface; and a fourth step of choosing the other face of the new reference divided-hyperface that is not the division line as the new reference face, a chain of the divided-hyperfaces that were chosen as reference divided-hyperfaces during the execution is obtained by executing the steps from the second step to the fourth step repeatedly, the three-dimensional shape obtained by the projection of the chain into the predetermined plane imitates the shape of the object, and the generation unit generates a four-dimensional shape by assigning basic blocks that contains one of the divided-hyperfaces of the chain to their corresponding basic space.

The generation unit may choose a set of points of the lattice to generate a four-dimensional shape by assigning basic blocks to all of the basic spaces which correspond to triangular pyramids defined by the chosen points of the lattice, and the generation unit may further include an administration unit operable to keeps the generated shape as a set of points.

The generation unit may encode the generated shape by assigning a value 0 or 1 to each divided-faces of the chain when one choose them in the second step.

According to a fifth aspect of the present invention, there is provided a shape processor for imitating the structure of a polymer in a three-dimensional space, including an approximation unit operable to generate a chain of basic tiles to imitates a part or all of the structure of a polymer, wherein the shape of the basic tile is a kind of tetrahedron, that is, a three-dimensional shape with four vertices, and the chain of basic tiles is generated by connecting a basic tile with the following tile by an face one by one from a initial tile.

The shape processor may further include a generation unit operable to generate a four-dimensional shape defined by the assignment of the basic block by specifying whether each basic block is assigned to corresponding basic space, wherein the basic block are assignable to each basic space, which is the convex hull of sixteen points of a lattice in a four-dimensional space, the basic block may include four hyperfaces projected into the three-dimensional space, each of the four hyperfaces of the basic block may be divided into six division hyperfaces by a division face, which is a face including either of a reference vertex shared by the four hyperface of the basic block, a vertex positioned opposite from the reference vertex on the hyperfaces, or another vertex on the hyperfaces. The generation unit may correspond to a part or all of the chain of the divided hyperfaces obtained by projecting the divided hyperfaces into the three-dimensional space, wherein the divided hyperfaces are included by each of the hyperfaces of one or more of the basic block(s) assigned in the basic space, may assign each of the basic blocks to the corresponding basic space, and may generate the four-dimensional shape that corresponds to a part or all of the structure of the polymer so that two adjacent basic tiles in the basic tile chain corresponds a part or all of shape obtained by projecting the divided-hyperfaces of one basic block or two consecutive basic blocks in the four-dimensional space into the three-dimensional space.

The shape processor may further include a generation unit operable to generate four-dimensional shape defined by designating whether each basic blocks assignable to each basic space surrounded by sixteen points of a lattice in a four-dimensional space is to be assigned to the corresponding basic space, so that a three-dimensional shape, which is defined by projecting it into a direction where three hyperfaces of the basic block consisting of the four-dimensional shape may be seen, may imitate the chain of basic tiles, wherein each of the hyperfaces of the basic block is divided into six divided hyperfaces by a division surface, which is a surface including either of a reference vertex which is a vertex shared by the four hyperfaces of the basic block projected into the projection direction, a vertex located opposite from the reference vertex on the hyperfaces, or another vertex on the hyperface. The generation unit may execute: a first step of choosing one of the divided-hyperfaces of a basic block as the initial reference divided-hyperface and one of the two faces of the initial reference divided-hyperface that are faces of the corresponding basic block as the reference face; a second step of choosing one of the two divided-hyperfaces which share the reference face with the reference divided-hyperface and whose image by the projection into the predetermined plane do not overlap with the image of the reference divided-hyperface by the same projection, wherein the generation unit chooses the divided-hyperface in such a way that the projection of the chosen divided-hyperface imitates a part or all of the structure of the polymer; a third step of choosing the divided-hyperface chosen in the second step as the new reference divided-hyperface; and a fourth step of choosing the other face of the new reference divided-hyperface that is not the division line as the new reference face. A chain of the divided-hyperfaces that were chosen as reference divided-hyperfaces during the execution is obtained by executing the steps from the second step to the fourth step repeatedly, the three-dimensional shape obtained by the projection of the chain into the predetermined plane imitates a part or all of the structure of the polymer, and the generation unit generates a four-dimensional shape by assigning basic blocks that contains one of the divided-hyperfaces of the chain to their corresponding basic space.

The generation unit may choose a set of points of the lattice to generate a four-dimensional shape by assigning basic blocks to all of the basic spaces which correspond to four-dimensional version of square pyramids defined by the chosen points of the lattice, and the generation unit further includes an administration unit operable to keep the generated shape as a set of points.

The generation unit may encode the structure of a polymer by assigning a value 0 or 1 to each divided-faces of the chain when one choose them in the second step.

The basic tile may include four vertices: A, B, C and D, the approximation unit generates a chain of basic tiles which imitates a part or all of the structure of the polymer by connecting a basic tile from the initial tile with a following tile sequentially such that three vertices C, D and B of the basic tile are coincide with vertices A, B and C of the following basic tile respectively, or three vertices C, D and A of the basic tile are coincide with vertices A, B and D of the following basic tile respectively.

The generation unit may encode a part or all of the structure of a polymer by assigning a value 0 or 1 to each basic tile of the chain which imitates the structure, where the assigned value denotes the way the basic tile is connected with the following basic tile.

The polymer may include a protein, and the generation unit imitates the structure of a chain of amino-acids which is a part or all of the protein, where one amino-acid corresponds to three consecutive basic tiles.

The polymer may include a DNA molecule, and the generation unit imitates the structure of a chain of nucleotides which is a part or all of the DNA molecule, where one nucleotides corresponds to one basic tile.

According to a sixth aspect of the present invention, there is provided a method for representing the structure of a polymer in a three-dimensional space, wherein the structure includes a predetermined set of basic tiles of three-dimensional shapes, each of which is associated with four vertices A, B, C and D which form a tetrahedron, a part or all of the structure of the polymer is imitated by a chain of basic tiles which is generated by connecting a basic tile from an initial tile with a following tile by face sequentially such that three vertices C, D and B of a basic tile are coincide with vertices A, B and C of the following basic tile respectively, or three vertices C, D and A of a basic tile are coincide with vertices A, B and D of the following basic tile respectively.

BRIEF DESCRIPTION OF THE DRAWINGS

FIG. 7 shows an example of a data format of vertices in the vertex-table of an administration-table-set 230 used in the first embodiment;

FIG. 8 shows an example of a data format of vertices in the shape-table of an administration-table-set 230 used in the first embodiment;

FIG. 19 shows a code of a hormone (insulin, human) encoded by the shape processing unit 120 which embodies the second embodiment;

DETAILED DESCRIPTION OF THE INVENTION

In the following several embodiments of the present invention are illustrated using the accompanying figures.

The First Embodiment of the Present Invention

Figure 1:
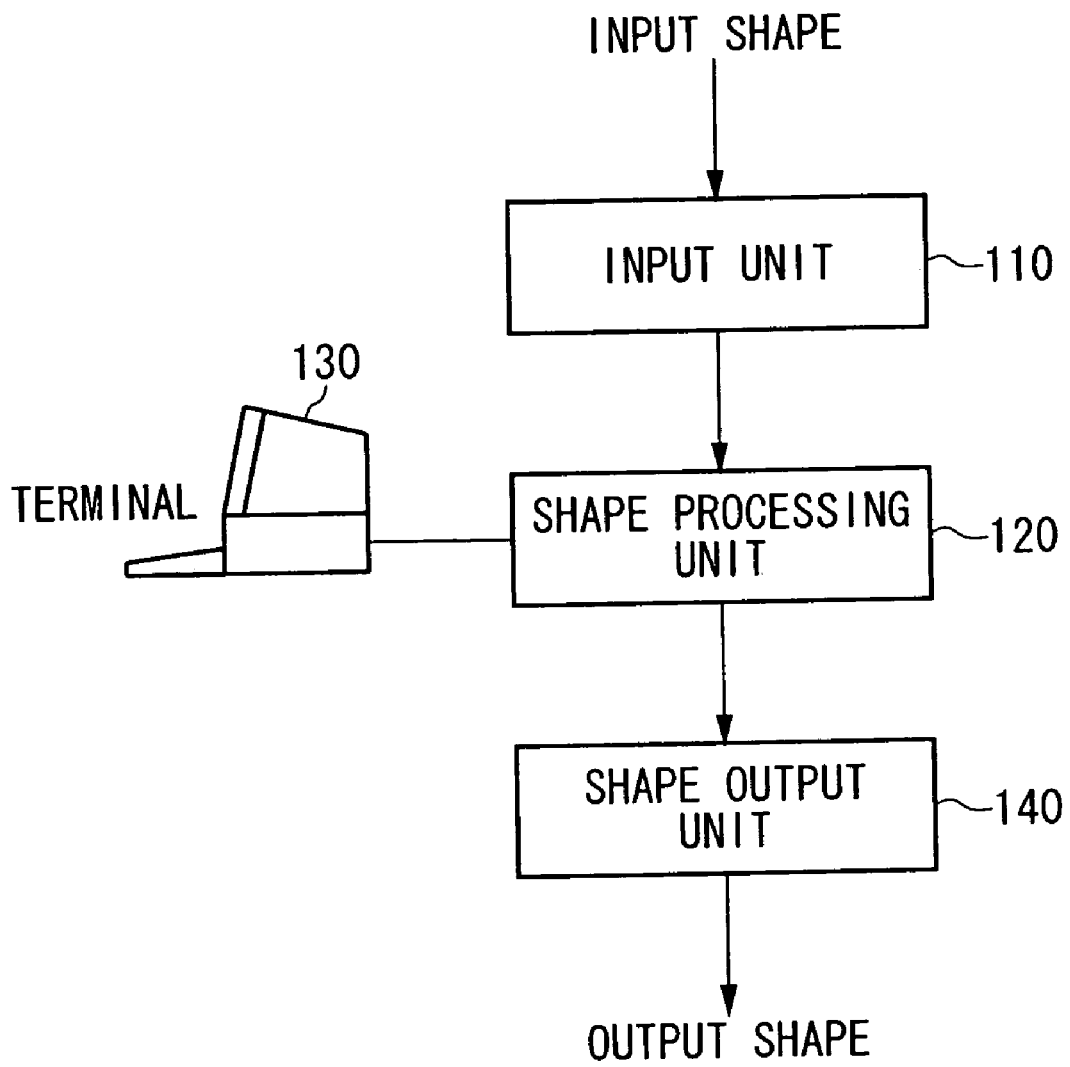
FIG. 1 shows a configuration of a shape processing system 100 according to a first embodiment of the present invention.

FIG. 1 shows a configuration of a shape processing system 100 according to a first embodiment of the present invention. The shape processing system 100 comprises a shape input unit 110, a shape processing unit 120, a terminal 130, and a shape output unit 140.

The shape input unit 110 receives data of the shape of an object in a two-dimensional space which is to be processed by the shape processing system 100. And the shape input unit 110 converts the data (which is analogue) into digital data for manipulations by the shape processing unit 120. The shape input unit 110 may be an input device such as a camera, a video recorder (video camera) and a scanner. Or the shape input unit 110 may be a mere interface to networks or files. The format of digital data converted by the shape input unit 110 may be any format for shape representation such as bit map, JPEG, MPEG, GIF, or polygon-mesh.

The shape processing unit 120 receives the digital data from the shape input unit 110, generates a corresponding three-dimensional shape and stores the shape. The shape processing unit 120 also performs various manipulations such as shape transformation of three-dimensional shape. three-dimensional shape and stores the shape. The shape processing unit 120 also performs various manipulation such as shape transformation of three-dimensional shape.

Moreover the shape processing unit 120 converts data of the three-dimensional shape into data for two-dimensional representation such as bit map, JPEG, MPEG, GIF, or polygon-mesh to reproduce the two-dimensional shape.

The terminal 130 is used by a user of the shape processing system 100 to control the shape processing unit 120 when he/she performs a shape transformation of a stored three-dimensional shape or a reproduction of a two-dimensional shape.

The shape output unit 140 outputs a two-dimensional shape reproduced by the shape processing unit 120. The shape output unit may be a mere interface to networks or files.

Figure 2:
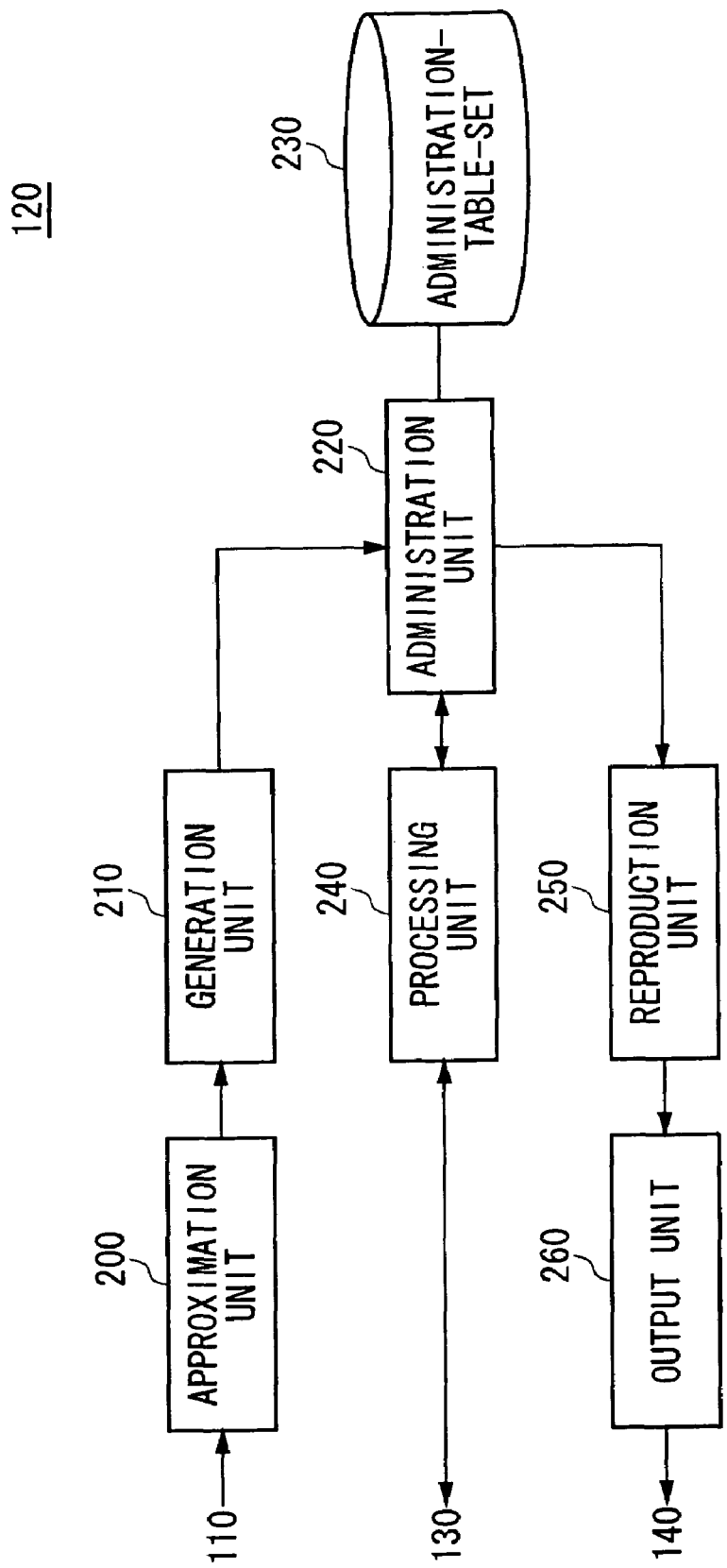
FIG. 2 shows a configuration of a shape processing unit 120 according to the first embodiment.

FIG. 2 shows a configuration of the shape processing unit 120 according to a first embodiment. The shape processing unit 120 comprises an approximation unit 200, a generation unit 210, an administration unit 220, an administration-table-set 230, a processing unit 240, a reproduction unit 250 and an output unit 260.

The approximation unit 200 receives digital data of two-dimensional shape converted from an input by the shape input unit 110. Connecting predetermined two-dimensional basic tiles one by one, the approximation unit 200 generates a chain of basic tiles which imitates the shape of an object.

The generation unit 210 transforms a chain of basic tiles generated by the approximation unit 200 into the corresponding three-dimensional shape. Moreover the generation unit 210 encodes the chain of basic tiles.

The administration unit 220 stores a three-dimensional shape and/or the corresponding code generated by the generation unit 210 in the administration-table-set 230 and administrates the tables.

A three-dimensional shape is stored in the administration-table-set 230 as a set of points in a three-dimensional lattice. The code of the shape is also stored in the administration-table-set 230.

The processing unit 240 performs various kind of three-dimensional transformations such as rotation, translation or deformation via the administration unit 220 under the directions from a user of the terminal 130.

The reproduction unit 250 receives data of a three-dimensional shape stored in the administration-table-set 230 via the administration unit 220 and converts data of the three-dimensional shape into data for two-dimensional representation such as bit map, JPEG, MPEG, GIF, or polygon-mesh to reproduce the corresponding two-dimensional shape.

The output unit 260 outputs the two-dimensional shape reproduced by the reproduction unit 250 as a file or displays the shape on a display device.

Figure 3:
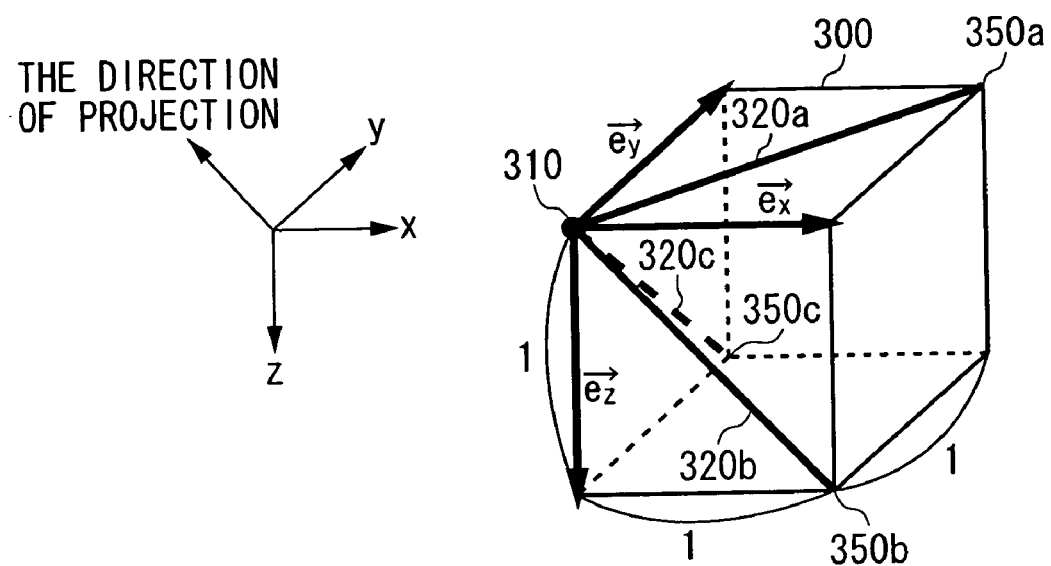
FIG. 3 shows the shape of a basic block 300 used in the first embodiment.

FIG. 3 shows the shape of the basic block 300 used in the first embodiment. The basic block 300 is a cube defined by three vectors ex, ey and ez of length 1. In this embodiment, the basic block is defined by ex=(1, 0, 0), ey=(0, 1, 0) and ez=(0, 0, 1) and is projected along the direction of (−1, −1, −1) into a plane which is perpendicular to (−1, −1, −1).

The basic block 300 has one reference vertex 310 and three division lines 320a, 320b and 320c. The reference vertex 310 is the nearest vertex of the basic block 300 to the point (−1, −1, −1). Thus the reference vertex is contained in all of the three upper faces of the basic block 300. (Here 'upper' is considered w.r.t. the direction from bottom (0, 0, 0) to top (−1, −1, −1)) The division line 320a is the segment connecting the reference vertex 310 and the opposite vertex 350a with respect to the upper face of the basic block 300 specified by z=0. The division line 320b is the segment connecting the reference vertex 310 and the opposite vertex 350b with respect to the upper face of the basic block 300 specified by y=0. And the division line 320c is the segment connecting the reference vertex 310 and the opposite vertex 350c with respect to the upper face of the basic block 300 specified by x=0.

The three-dimensional space used in this embodiment to represent shapes of objects is equipped with a three-dimensional lattice structure whose unit convex hull is identical to the basic cube 300. We call a unit convex hull of the lattice a "basic space". That is, a basic space is a convex hull of eight points of the lattice. And the shape of an object is represented using the lattice points of the space.

Figure 4:
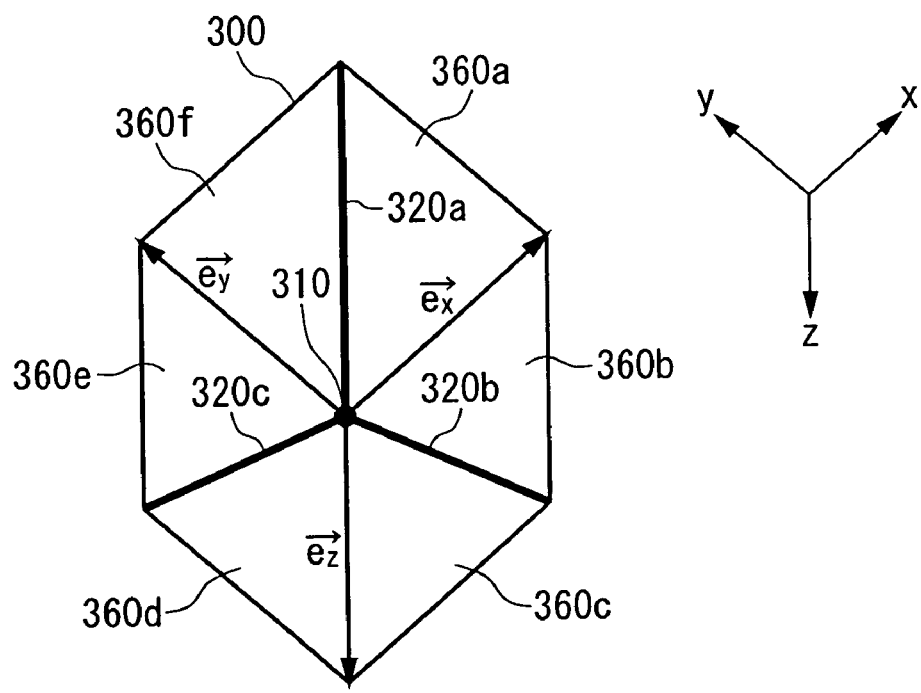
FIG. 4 is the projection of the basic block 300 into the predetermined two-dimensional plane.

FIG. 4 is the projection of the basic block 300 into a predetermined two-dimensional plane. The image of the basic block 300 by the projection is a hexagon whose center coincides with the image of the reference vertex 310. Moreover the hexagon is divided into six divided-faces 360a, . . . , 360f which are congruent equilateral triangles by three division lines 320a, 320b and 320c and three vectors ex, ey and ez.

We call the equilateral-triangles-shaped divided-faces 360a, . . . , 360f "basic tiles". The approximation unit 200 generates a chain of basic tiles, which imitates the shape of an object conveyed from the input unit 110, connecting a basic tile with another basic tile by an edge which is not any division line one by one.

The generation unit 210 generates a three-dimensional shape by assigning basic blocks to basic spaces. Basic blocks are assigned in such a way that the shape of an object conveyed from the input unit 110 is imitated by the chain of basic tiles obtained by projecting a part of the resulting three-dimensional shape along the vector (−1, −1, −1) into the predetermined two-dimensional plane.

Instead of the basic block 300, the shape processing unit 120 may use a three-dimensional block with curved edges and curved faces as a basic block. Or the shape processing unit 120 may use a basic block where some of the division lines are curves.

And the shape processing unit 120 may project basic blocks along another vector into another plane. For example, (−2, −1, −1) will do. In that case, the projected image of the basic block 300 is divided into six triangles which are not equilateral and basic tiles are no longer equilateral triangles. But the generation unit 210 can generate a chain of basic tiles similarly.

Moreover, the shape processor may use three vectors ex, ey and ez of different lengths. (Then the basic block is a cuboid.)

Figure 5:
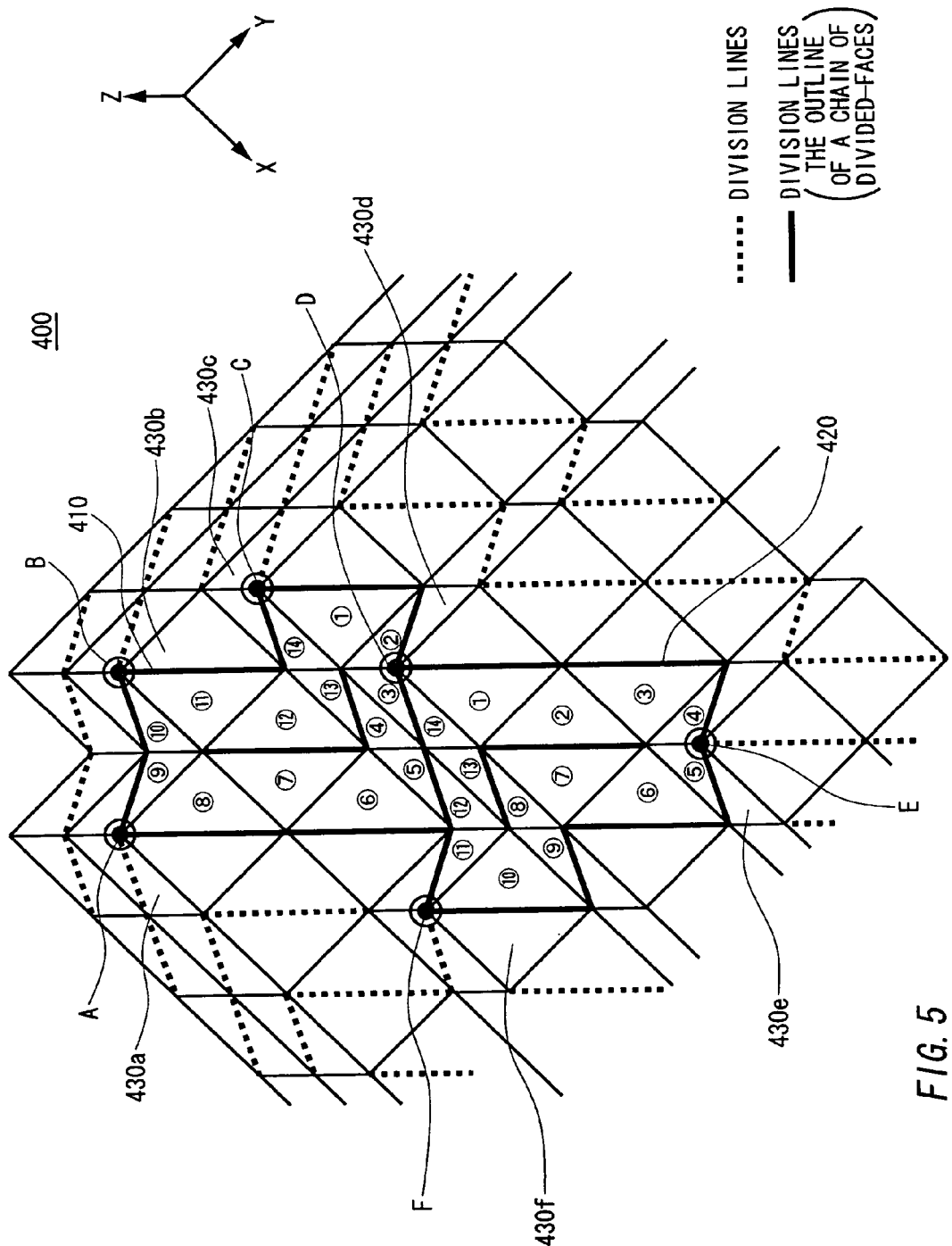
FIG. 5 shows an example of a three-dimensional shape 400 generated in the first embodiment.

FIG. 5 shows an example of a three-dimensional shape 400 generated in the first embodiment. The three-dimensional shape 400 corresponds to two chains A410 and B410 of basic tiles. And each of two chains of divided-faces (on the three-dimensional shape) that corresponds to chain A410 and B410 is composed of fourteen divided-faces.

The part of the three-dimensional shape which corresponds to chain A410 is a union of four triangular pyramids (without bases). The four triangular pyramids are (1) the pyramid whose peak (top vertex) is the reference vertex of a basic block 430a which corresponds to a lattice point A and slopes are defined by three (upper) faces of basic block 430a, (2) the pyramid whose peak is the reference vertex of a basic block 430b which corresponds to a lattice point B and slopes are defined by three (upper) faces of basic block 430b, (3) the pyramid whose peak is the reference vertex of a basic block 430c which corresponds to a lattice point C and slopes are defined by three (upper) faces of basic block 430c and (4) the pyramid whose peak is the reference vertex of a basic block 430d which corresponds to a lattice point D and slopes are defined by three (upper) faces of basic block 430d.

The part of the three-dimensional shape which corresponds to chain B410 is a union of three triangular pyramids. The three triangular pyramids are (1) the pyramid whose peak is the reference vertex of a basic block 430d which corresponds to a lattice point D and slopes are defined by three (upper) faces of basic block 430d, (2) the pyramid whose peak is the reference vertex of a basic block 430e which corresponds to a lattice point E and slopes are defined by three (upper) faces of basic block 430e and (3) the pyramid whose peak is the reference vertex of a basic block 430f which corresponds to a lattice point F and slopes are defined by three (upper) faces of basic block 430f.

In this way, the generation unit 210 transforms a chain of basic tiles received from the input unit 200 into a three-dimensional shape which consists of triangular pyramids whose peaks (top vertices) are points of a lattice in a three-dimensional space. The three faces of a triangular pyramid are defined by three (upper) faces of a basic block whose reference vertex coincides with the peak of the triangular pyramid. And the corresponding three-dimensional shape is obtained by assigning (one of an infinite number of) basic blocks to an area covered by the triangular pyramid. In particular, the generation unit 210 specifies a three-dimensional shape by its peaks.

Figure 6:
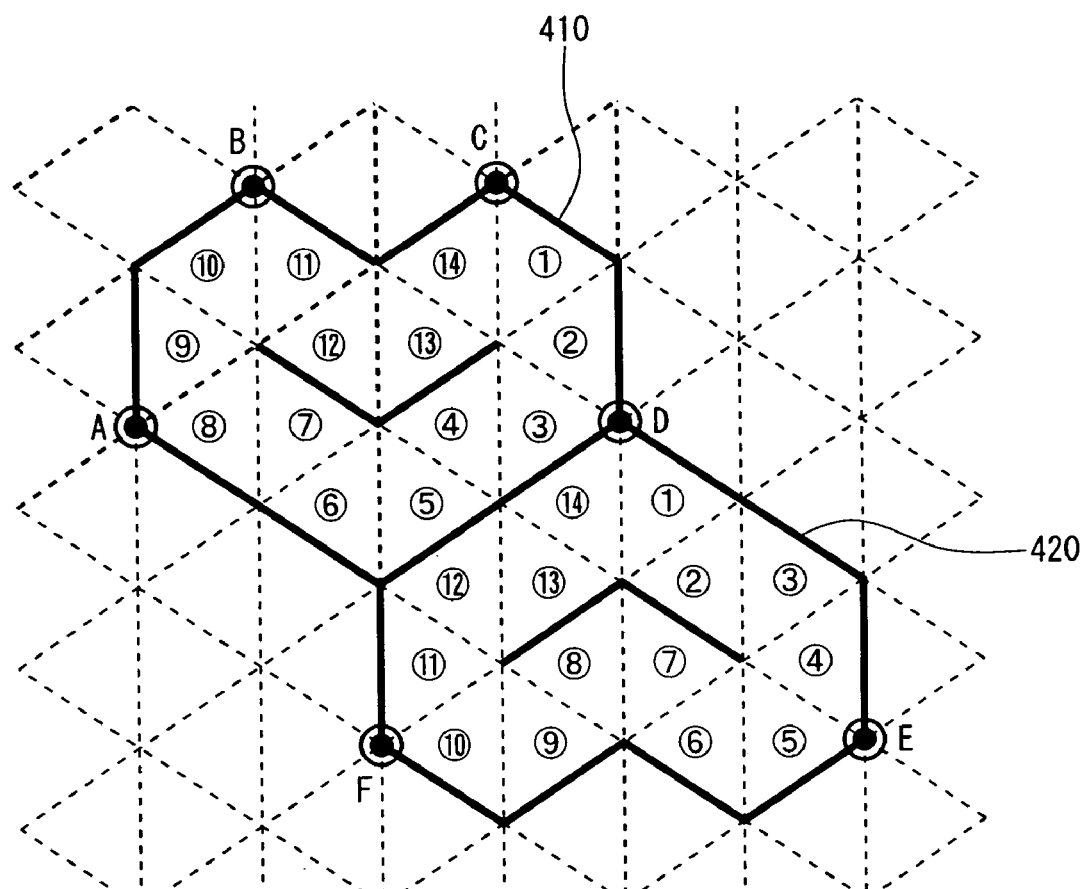
FIG. 6 shows the projection of the three-dimensional shape 400 onto the predetermined two-dimensional plane.

FIG. 6 shows the projected image of three-dimensional shape 400 in the predetermined two-dimensional plane. As shown in the FIG. 6, the chain of divided-faces which corresponds to chain A410 of basic tiles is mapped onto a chain of equilateral triangles in the plane. And the chain of divided-faces which corresponds to chain B410 is also mapped onto such a chain.

When the shape processing system 120 processes the shape of an object in a two dimensional space, the approximation unit 200 imitates the shape with a set of chains of basic tiles such as chains A410 and B420 and the generation unit 210 transforms the chains of (two-dimensional) basic tiles into a three-dimensional shape such as shape 400.

And when the shape processing unit 120 reproduces a two-dimensional shape from its corresponding three-dimensional shape stored in the administration-table-set 230, the reproducing unit 250 fetches data of a three-dimensional shape in the administration-table-set 230 via the administration unit 220 and reproduces the corresponding two-dimensional shape such as chains A410 and B420.

FIG. 7 shows an example of a data format of vertices stored in the vertex-table of the administration-table-set 230 used in the first embodiment. An entry of the vertex-table consists of an ID-of-shape field and a coordinates-of-vertex filed.

An ID-of-shape field contains an identifier of the corresponding shape stored in the administration-table-set 230. In FIG. 7 the identifier of chain A410 (resp. B420) of basic tiles is 001 (resp. 002).

A coordinates-of-vertex field contains the cartesian coordinates in three dimensions of a peak of the corresponding three-dimensional shape.

The administration unit 220 administers three-dimensional shapes that correspond to the shape of a two-dimensional object using data of their peaks in the vertex-table.

FIG. 8 shows an example of a data format of vertices stored in the shape-table of the administration-table-set 230 used in the first embodiment.

An entry of the shape-table of the administration-table-set 230 consists of an ID-of-shape field, an initial-tile field, a terminal-tile field and a code field.

An ID-of-shape field contains an identifier of the corresponding shape stored in the administration-table-set 230. In FIG. 8, the identifier of chain A410 (resp. B420) of basic tiles is 001 (resp. 002).

An initial-tile field contains the data of the initial divided-face of the corresponding chain of divided-faces. In FIG. 8, the initial divided-face of chain A410 is specified by reference vertex (−1, 2, −1) which we denote by C. The vertices of the initial divided-face are C, C+ex and C+ex+ey. (Recall that ex, ey and ez are the vectors used to define basic blocks.)

A terminal-tile field the data of the terminal divided-face of the corresponding chain of divided-faces. In FIG. 8, the terminal divided-face of chain A410 is specified by reference vertex (−1, 2, −1), i.e., C. The vertices of the terminal divided-face are C, C+ex and C+ex+ez.

A code field contains the code of the corresponding chain of divided-faces.

The administration unit 220 administers the chain of divided-faces which corresponds to the shape of a two-dimensional object using data of the initial tile, the terminal tile and the code of the chain of divided-faces in the shape-table.

Figure 9:
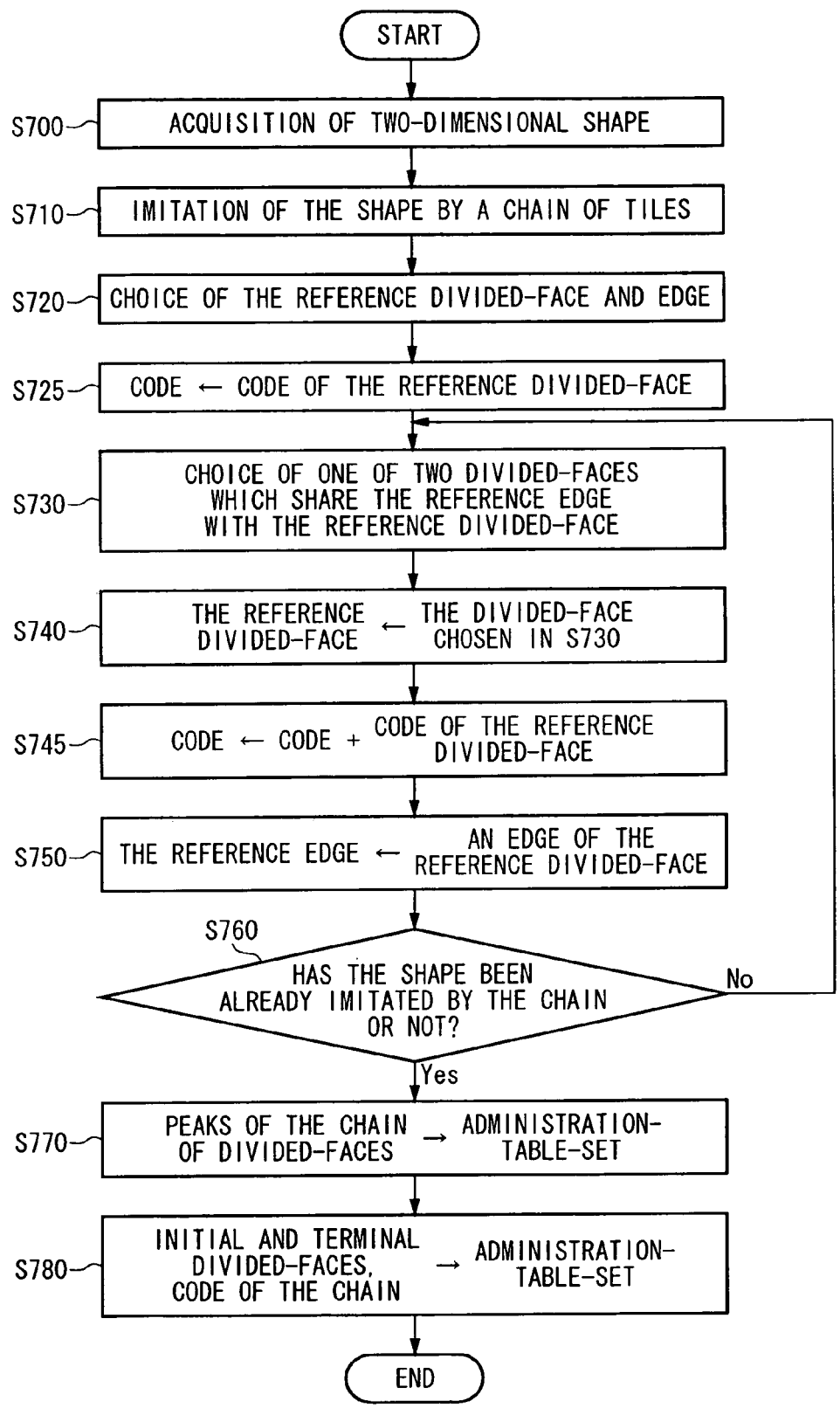
FIG. 9 shows the procedure performed by the shape processing unit 120 for the first embodiment of the present invention.

FIG. 9 shows the procedure performed by the shape processing unit 120 for the first embodiment of the present invention. As explained bellow, the flow chart in FIG. 9 illustrates the procedure to transform the shape of an object into the data format of the administration-table-set 230 and generate the code of the shape of the given object.

First, the approximation unit 200 receives the shape of an object in a two-dimensional space from the input unit 110 (S700). And the approximation unit 200 generates a chain of basic tiles which imitates the shape of the given object (S710)

Next, the generation unit 210 chooses one of three divided-faces of a basic tile of the chain as the initial reference divided-face and one of two edges of the reference divided-face which are not the division line (, that is, which are also edges of the corresponding basic block,) as the reference edge (S720). And the generation unit 210 assigns a symbol of code, which reflects the shape of the given object, to the initial reference divided-face as the initial symbol of the code of the object. In this embodiment, where the direction from up to down is defined by the vector ex+ey+ez, the generation unit 210 assigns symbol "0" (or "D") to the reference divided-face when the reference edge corresponds to the lower edge of the reference divided-face and "1" (or "U") when the reference edge corresponds to the upper edge of the reference divided-face.

Next, the generation unit 210 chooses one of two divided-faces which share the reference edge with the reference divided-face and whose image by the projection into the predetermined plane do not overlap with the image of the reference divided-face by the same projection (S730). The generation unit 210 chooses the divided-face in such a way that the projection of the chosen divided-face imitates a part or all of the shape of the given object. In this embodiment, the image of a divided-face by the projection overlaps with the image of another divided-face when both of the divided-face correspond the same basic tile.

Next, the generation unit 210 chooses the divided-face chosen in the step of S730 as the new reference divided-face (S740). And the generation unit 210 appends a symbol "0" (or "D") or "1" (or "U") to the right end of the code as the symbol which corresponds to the new reference divided-face.

Next, the generation unit 210 chooses the edge of the new reference divided-face that is not the division line and not chosen in the step of S730 as the new reference edge (S750).

The generation unit 210 executes steps S730, S740, S745 and S750 repeatedly until the shape of the given object is imitated by the obtained chain of divided-faces (S760).

Finally, the generation unit 210 transforms the obtained chain of divided-faces into a three-dimensional shape and stores all peaks of the three-dimensional shape in the vertex-table of the administration-table-set 230 (S770). The generation unit 210 also stores the initial and terminal divided-face of the chain and the code obtained by the above procedure in the shape-table of the administration-table-set 230 (S780).

As explained above, the generation unit generates a chain of divided-faces by repeated executions of steps S730, S740, S745 and S750. And the shape of the given object is imitated by the two-dimensional shape obtained by projecting the chain of divided-faces into the predetermined plane.

The generation unit 210 also generates the corresponding three-dimensional shape by assigning basic blocks which include one of the divided-faces of the chain to the corresponding basic spaces.

Recall that, for each point of a lattice, there exists a basic block 300 whose reference vertex 310 is given by the point and it defines a triangular pyramid whose peak (top vertex) is the reference vertex and the slopes are defined by the predetermined three faces of the basic block. (Note that pyramids are without bases.)

The generation unit 210 generates a three-dimensional shape by assigning all basic blocks which are covered by a set of triangular pyramids to the corresponding basic spaces. Thus a three-dimensional shape generated in the above procedure is specified by peaks of all triangular pyramids.

And the administration unit 220 stores peaks of all triangular pyramids in the administration-table-set 230 and uses the peaks to administer the three-dimensional shape.

Moreover the generation unit 210 may encode the shape of the given object by assigning either value 0 or 1 to each divided-face of the chain in step S745. The choice of value reflects the choice of divided-face in the step S740.

Figure 10:
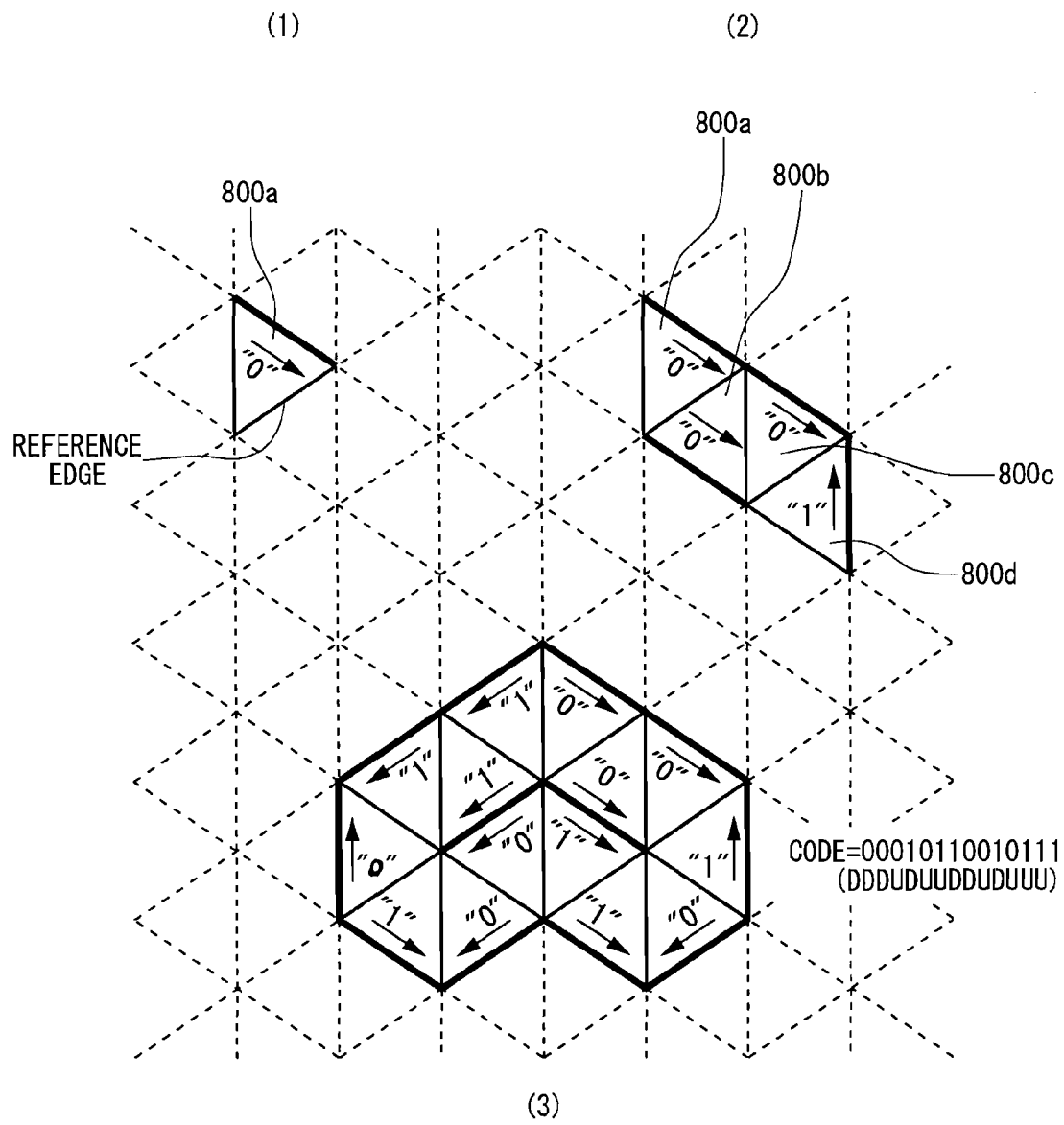
FIG. 10 illustrates an example of the procedure performed by the generation unit 210 to generate a chain B420 of the basic blocks in order to embody the first embodiment of the present invention.

FIG. 10 illustrates an example of the procedure performed by the generation unit 210 to generate chain B420 of basic blocks in order to embody the first embodiment of the present invention.

First, the generation unit 210 chooses a divided-face 800*a* as the reference divided-face as shown in (1) of FIG. 10. Here we suppose that the arrow in the figure (1) shows the direction from the upper edge to the lower edge of divided-face 800*a* and the generation unit 210 chooses the lower edge as the reference edge. Then the generation unit 210 assign symbol "0" to the reference divided-face.

Next, the generation unit 210 chooses divided-faces 800*b*, 800*c* and 800*d* serially to imitate the shape of the object received from the approximation unit 200 as shown in (2) of FIG. 10. It is arranged such that two consecutive divided-faces share the same gradient when their division lines don't intersect. (Recall there is one division line for each divided-face.) In the case of the figure (2), divided-face 800*a* and 800*b* share the same gradient. Divided-face 800*b* and 800*c* also share the same gradient.

On the other hand, it is arranged such that two consecutive divided-faces do not share the same gradient when their division lines share an end point as in the case of divided-faces 800*c* and 800*d* in (2) of FIG. 10. Then the generation unit 210 assigns symbol "0" to divided-faces 800*b* and 800*c* since they slope down. And the generation unit 210 assigns symbol "1" to divided-face 800*d* since it slopes up.

The generation unit 210 transforms a chain of basic tiles which imitates the shape of the given object into a chain of divided-face in a three-dimensional space in such a way explained above. In (3) of FIG. 10, arrows on basic tiles of a chain show the gradient (the direction from up to down) of the basic tiles. Considering the directions, the generation unit 210 assigns a divided-face in a three-dimensional space to each of the basic tiles. The generation unit 210 generates a three-dimensional shape by assigning basic blocks which contain one of the divided-faces to the corresponding basic spaces. And the generation unit 210 assign either "0" or "1" to each basic tile of the chain, where the choice depends on the direction. ("0" when it slopes down and "1" when it slops up.)

In this way, the chain of divided-faces in (3) is transformed into a three-dimensional shape which coincides with the part of shape 400 in FIG. 5 which corresponds to chain B420 of basic tiles.

As explained above, the generation unit 210 generates a three-dimensional shape from a chain of basic tiles by assigning basic blocks 300 to the corresponding basic space. The assignment is done in such a way that the chain of basic tiles corresponds to a part or all of the projection of divided-faces of the assigned basic blocks. (Recall that each basic block 300 has six divided-faces that are obtained by dividing three faces of a basic block by the division lines 320*a*, 320*b* and 320*c*.)

And the generation unit 210 generates a three-dimensional shape from a chain of basic tiles in such a way that each pair of consecutive basic tiles of the chain corresponds to two divided-faces of one basic block or two consecutive basic blocks. The generated three-dimensional shape corresponds to the shape of the given object.

As is shown above, the shape processing unit 120 according to the first embodiment transforms the shape of an object into a chain of basic tiles. And the shape processing unit 120 identifies the shape with peaks of a three-dimensional shape which corresponds to the chain of basic tiles.

In this way, the shape processing unit 120 identifies various kind of shapes which are imitated by a number of basic tiles with a set of lattice points (i.e., peaks) in a three-dimensional space. Therefore, by using the shape processing unit 120 according to the first embodiment, one can save memory of a computer when he/she stores shapes of objects. Moreover one can rotate or/and translate the shape of an object with less amount of calculation.

Furthermore, the shape processing unit 120 can encode the shape of an object assigning a sequence of symbols ("0" or "1") to a chain of divided-faces which corresponds to the chain of basic tiles obtained from the shape of the object. That is, the shape processing unit 120 can encode any shape which is imitated by a sequence of basic tiles using only 1 bit for each basic tile. Thus, using the shape processing unit 120, one needs less memory when he/she stores shapes of objects.

The Second Embodiment of the Present Invention

Now the second embodiment of the present invention is explained. The explanation is focused on the difference between the first embodiment and the second embodiment.

The shape processing unit 120 according to a second embodiment generates a chain of basic tiles in a three-dimensional space to imitate the shape of an object, transforms the chain of basic tiles into a four-dimensional shape, and finally stores the four-dimensional shape in a storage.

Figure 11:
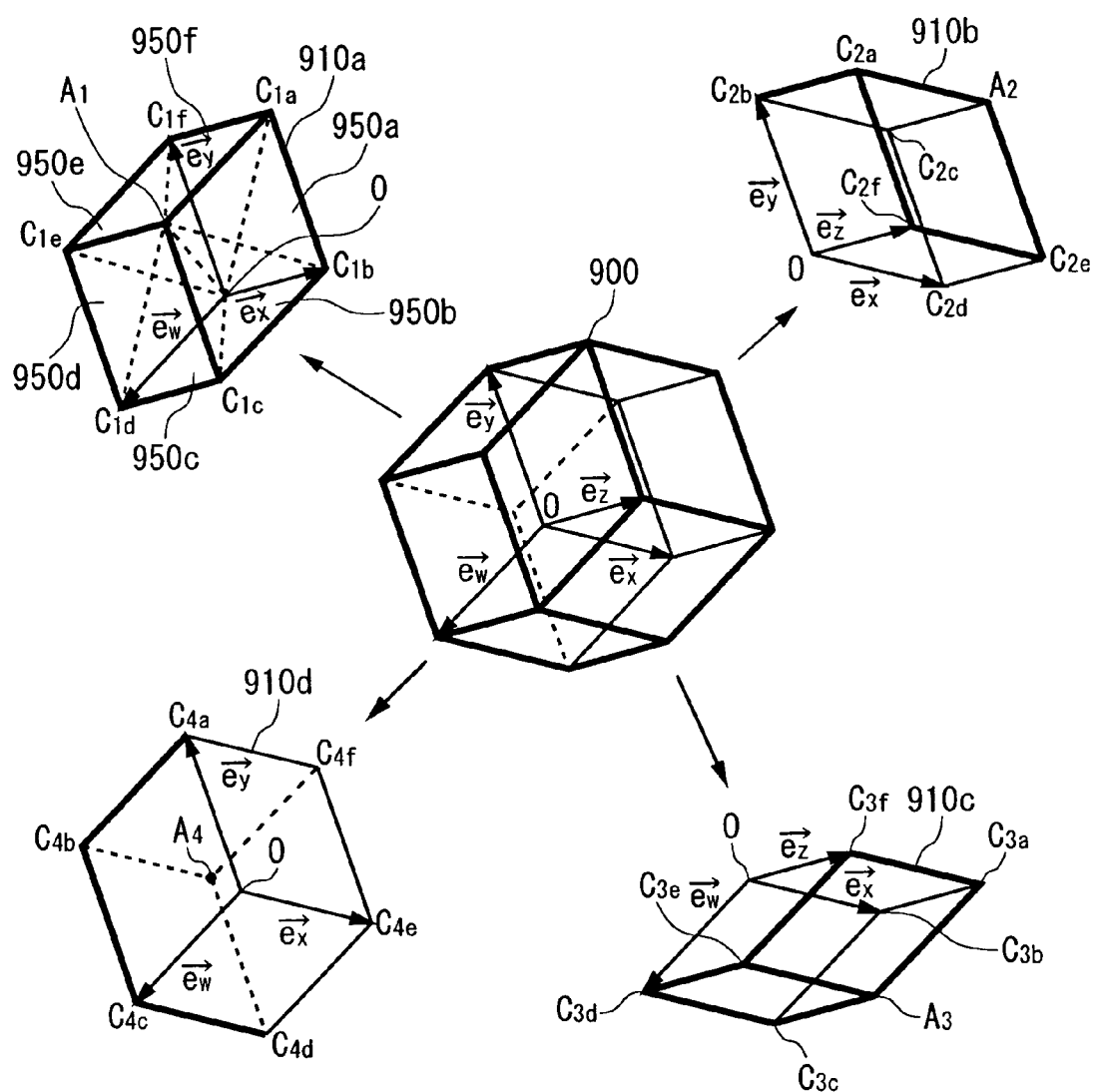
FIG. 11 shows the shape of a basic block 900 used in the second embodiment.

FIG. 11 shows the shape of a basic block 900 used in the second embodiment. (In fact, their projected image into a three-dimensional space.) Basic block 900 is a cube in a four-dimensional space defined by four vectors ex, ey, ez and ew of length 1. which are perpendicular to each other. By projecting into a three-dimensional-space, basic block 900 is mapped onto a three-dimensional shape which consists of images of four (three-dimensional) faces 910a, 920b, 910c and 910d of the block. Since faces 910a, 920b, 910c and 910d correspond to hyperfaces in a four-dimensional space (as faces of a three-dimensional cube correspond to plane in a three-dimensional space), we call them "hyperfaces".

Four hyperfaces 910a, 920b, 910c and 910d share a vertex O which is called the "reference vertex" of basic block 900.

Hyperface 910a is a hexahedron which contains reference vertex O and defined by three vectors ey, ez and ew. Hyperface 910a has eight vertices O, A1, C1a, C1b, C1c, C1d, C1e and C1f. Vertex A1 is the opposite vertex of reference vertex O. In hyperface 910a, we define six division faces by 3-tuple of vertices: reference vertex O, vertex A1 and one of the other vertices C1a, C1b, C1c, C1d, Ce and C1f. And hyperface 910a is divided into six divided-hyperfaces by six division faces OA1C1a, OA1C1b, OA1C1c, OA1C1d, OA1C1e and OA1C1f, where OA11a denotes the convex-hull of three points O, A1 and C1a (, i.e., a two-dimensional region in a three-dimensional space).

Hyperface 910b is a hexahedron which contains reference vertex O and defined by three vectors ex, ey and ez. Hyperface 910b has eight vertices O, A2, C2a, C2b, C2c, C2d, C2e and C2f. Vertex A2 is the opposite vertex of reference vertex O. In hyperface 910b, we define six division faces by 3-tuple of vertices: reference vertex O, vertex A2 and one of the other vertices C2a, C2b, C2c, C2d, C2e and C2f. And hyperface 910b is divided into six divided-hyperfaces by the six division faces.

Hyperface 910c is a hexahedron which contains reference vertex O and defined by three vectors ex, ez and ew. Hyperface 910c has eight vertices O, A3, C3a, C3b, C3c, C3d, C3e and C3f. Vertex A3 is the opposite vertex of reference vertex O. In hyperface 910c, we define six division faces by 3-tuple of vertices: reference vertex O, vertex A3 and one of the other vertices C3a, C3b, C3c, C3d, C3e and C3f. And hyperface 910c is divided into six divided-hyperfaces by the six division faces.

Hyperface 910d is a hexahedron which contains reference vertex O and defined by three vectors ex, ey and ew. Hyperface 910d has eight vertices O, A4, C4a, C4b, C4c, C4d, C4e and C4f. Vertex A4 is the opposite vertex of reference vertex O. In hyperface 910d, we define six division faces by 3-tuple of vertices: reference vertex O, vertex A4 and one of the other vertices C4a, C4b, C4c, C4d, C4e and C4f. And hyperface 910d is divided into six divided-hyperfaces by the six division faces.

The four-dimensional space used in this embodiment to represent the shape of an object is equipped with a four-dimensional lattice structure whose unit cube is identical to basic cube 900. We call unit cubes of the lattice "basic spaces", i.e., a basic space is a convex hull of sixteen points of the lattice.

And the shape of an object is represented using lattice points of the space.

We call the tetrahedron-shaped divided-hyperfaces of hyperfaces 910a, 910b, 910c and 901d "basic tiles". Connecting a basic tile with another by an face which is not any division face, the approximation unit 200 generates a chain of basic tiles to imitate the shape of the object which is conveyed from the input unit 110.

The generation unit 200 generates a four-dimensional shape assigning basic blocks to basic spaces of a four-dimensional space with the lattice structure. Basic blocks are assigned in such a way that the shape of an object conveyed from the input unit 110 is imitated by the chain of basic tiles which is obtained by projecting a part or all of the resulting four-dimensional shape into a predetermined hyperface.

Concretely speaking, the generation unit 200 generates a chain of divided-hyperfaces connecting by a face which is not any division face. (Note that there are two such faces for each divided-hyperface.) For example, the generation unit 210 connects basic tile 950a to another basic tile by face OC1aC1b or face A1C1aC1b.

The generation unit 210 maps a divided-hyperface in a four-dimensional space onto a basic tile in a three-dimensional space when the unit 210 projects a chain of divided-faces in the four-dimensional space into the three-dimensional space. The generation unit 210 generates a four-dimensional shape assigning basic blocks which contain one of the divided-hyperfaces of the chain and store it in the administration-table-set 230.

As a result, the chain of divided-hyperfaces in a four-dimensional space generated by the generation unit is projected onto a chain of basic tiles in a three-dimensional space.

Instead of the basic block 900, the shape processing unit 120 may use a four-dimensional block with curved edges, curved faces and/or curved hyperface as a basic block. Or the shape processing unit 120 may use a basic block where some of the division faces are curved faces.

And the shape processing unit 120 may project basic blocks along another vector into a plane. In that case, the image of the basic block 900 may be divided into twenty-four divided-hyperfaces which are not identical. (Therefore, basic tiles are no longer identical). But the generation unit 210 can generate a chain of basic tiles similarly.

Moreover, the shape processor may use four vectors ex, ey ez and ew of different lengths.

Figure 12:
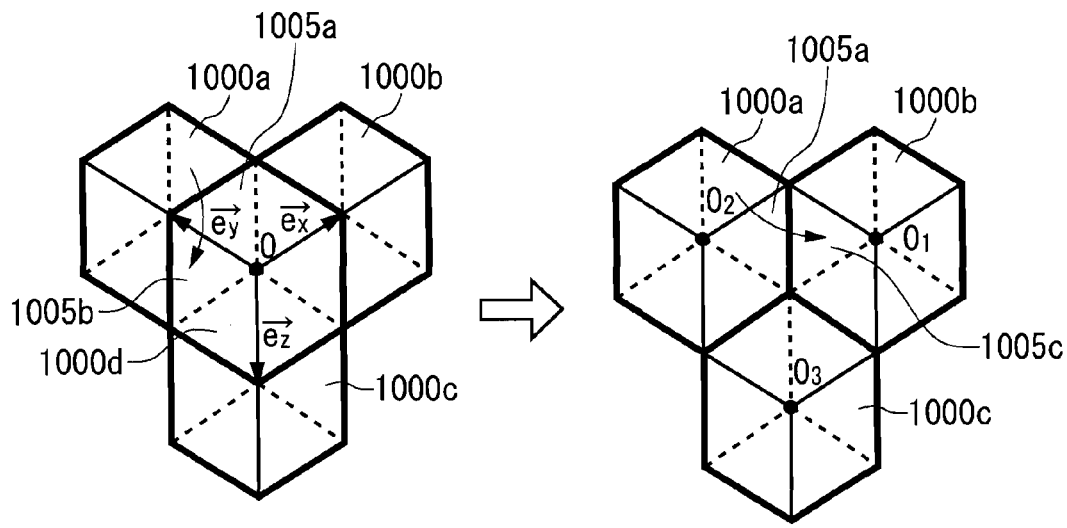
FIG. 12 shows the correspondence between a set of basic blocks and a chain of basic tiles used in the second embodiment by comparing the second embodiment with the first embodiment.
Figure 12:
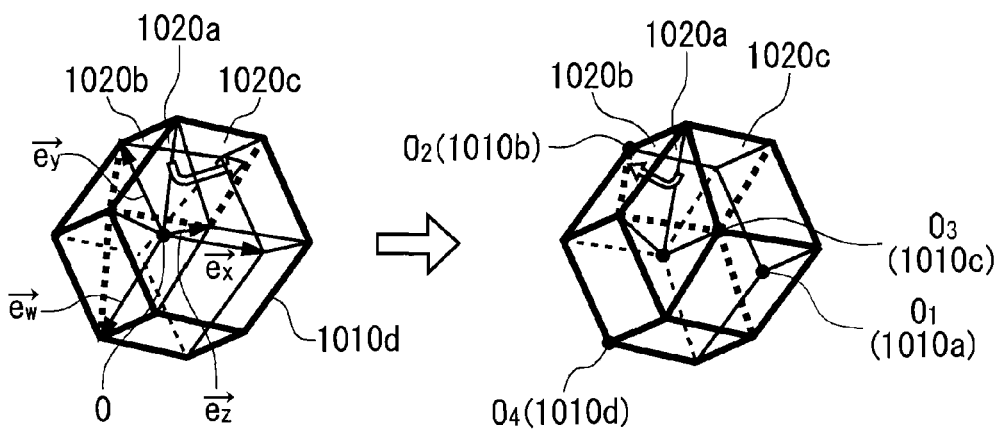

FIG. 12 shows the correspondence between a set of basic blocks and a chain of basic tiles used in the second embodiment (by comparing the second embodiment with the first embodiment).

The upper figure of FIG. 12 shows the correspondence of a set of basic blocks in a three-dimensional space to a chain of basic tiles in the case of the first embodiment.

The left side of the upper figure of FIG. 12 shows the top elevation of a three-dimensional triangular pyramid without base whose peak is formed by a basic block 1000d. In the left side of the upper figure of FIG. 12, basic blocks 1000a, 1000b and 1000c are contained in the triangular pyramid defined by reference vertex O and three faces of basic block 1000d. The dotted line on basic blocks 1000a, 100b, 1000c and 1000d show division lines of the corresponding basic blocks. In particular, basic tile 1005a is connected with basic tile 1005b.

The right side of the upper figure of FIG. 12 shows the top elevation of a three-dimensional shape which is obtained by removing basic block 1000d from the triangular pyramid of the left side whose peak is formed by basic block 1000d. Removing basic block 1000d, we have three new peaks O1, O2 and O3.

Note that O1, O2 and O3 are reference vertices of the corresponding basic blocks and they are obtained by translating reference vertex O of the basic block 1000d along vectors ex, ey and ez. In particular, this relationship induces an order relation among lattice points in a triangular pyramid, that is, (the position of) a lattice point is said to be higher than (the positions of) the lattice points obtained by translation of a lattice point along ex, ey or ez. Moreover, removing basic block 1000*d*, faces of basic blocks 1000*a*, 1000*b* and 1000*c* have come in sight. And accordingly the arrangement of division lines of basic tile 1005*a* has changed. As a result, basic tile 1005*a* is connected with basic tile 1005*c* in right side of the upper figure of FIG. 12.

As explained above, in the first embodiment, the assignment of basic blocks in a three-dimensional space (i.e., the shape of a triangular pyramid which consists of the assigned basic blocks,) determines connections among basic tiles, therefore, chains of basic tiles.

The lower figure of FIG. 12 shows the correspondence of basic blocks in a four-dimensional space to a chain of basic tiles in the case of the second embodiment. (Exactly speaking, it shows the correspondence between the projection of the basic blocks into a three-dimensional space and the projection of a chain of basic tiles into a three-dimensional space.)

The left side of the lower figure of FIG. 12 is a perspective drawing of the projection of a four-dimensional version of square pyramid whose peak is the reference vertex of a basic block 1010*d* and the four (three-dimensional) slopes are defined by the predetermined four (three-dimensional) faces of basic block 1010*d*. (Note that 1010*d* is a basic block in a four-dimensional space.) The dotted lines on basic block 1010*d* show some edges of its division faces. And basic tile 1020*a* is connected to basic tile 1020*c* in the left side of the lower figure of FIG. 12.

The right side of the lower figure of FIG. 12 is a perspective drawing of the projection of a four-dimensional shape which is obtained by removing basic block 1010*d* from the four-dimensional version of square pyramid whose peak is formed by basic block 1010*d* (i.e., the left side of this figure). Removing basic block 1010*d*, we have four new peaks O1, O2, O3 and O4.

Note that O1, O2 and O3 are reference vertices of the corresponding basic blocks and they are obtained by translating the reference vertex O of the basic block 1010*d* along the vector ex, ey, ez and ew. In particular, this relationship induces an order relation among lattice points in a four-dimensional version of square pyramid, that is, (the position of) a lattice point is said to be higher than (the positions of) the lattice points obtained by translation of a lattice point along ex, ey ez or ew. Moreover, removing basic block 1010*d*, (three-dimensional) faces of the basic blocks with reference vertices O1, O2, O3 and O4 have come in sight. And accordingly the arrangement of division faces of basic tile 1020*a* has changed. As a result, basic tile 1020*a* is connected with basic tile 1020*b* in right side of the upper figure of FIG. 12.

As explained above, in the second embodiment, the assignment of basic blocks in a four-dimensional space (i.e., the shape of the four-dimensional version of a square pyramid which consists of the assigned basic blocks,) determines connections among basic tiles, therefore, chains of basic tiles.

Figure 13:
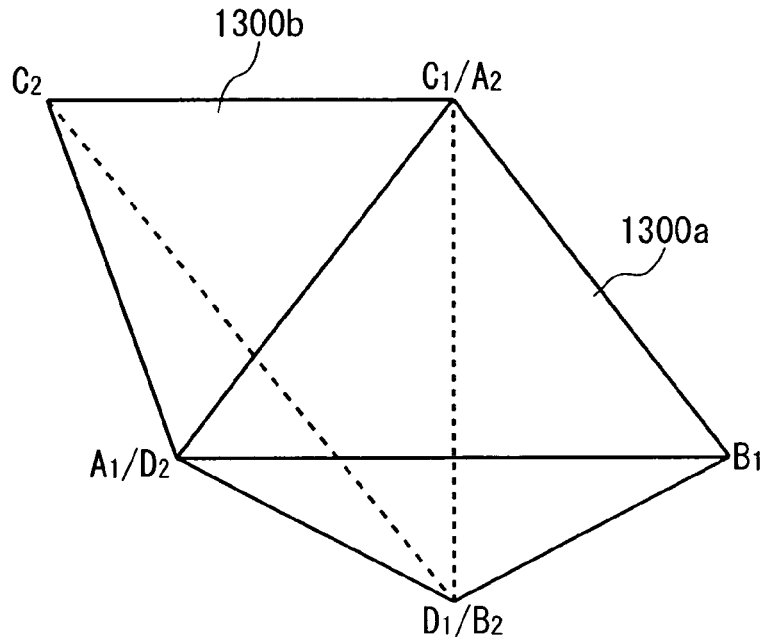
FIG. 13 shows two types of connections of basic tiles used in the second embodiment.
Figure 13:
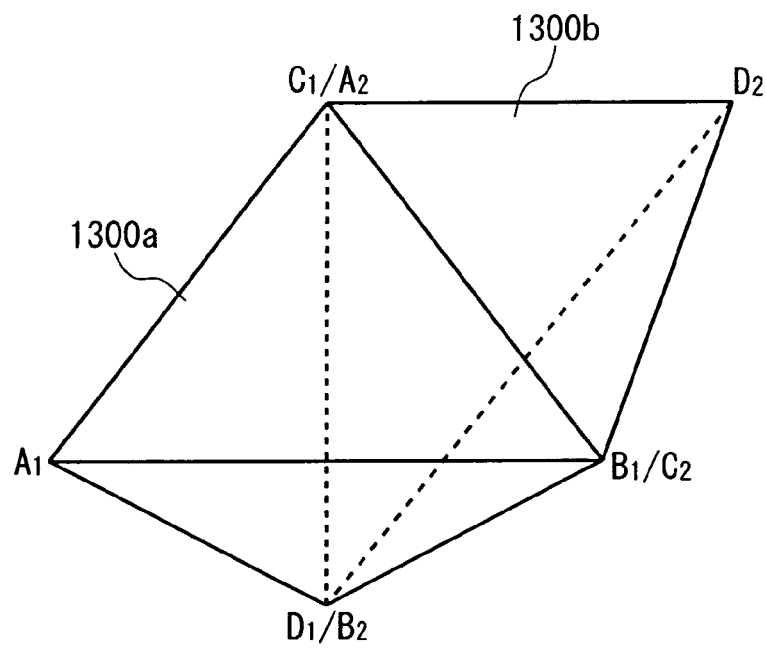

FIG. 13 shows two types of connections of basic tiles used in the second embodiment.

Basic tile 1300*a* is a three-dimensional object which is a kind of tetrahedron defined by four vertices A1, B1, C1 and D1. Basic tile 1300*b* is a three-dimensional object which is a kind of tetrahedron defined by four vertices A2, B2, C2 and D2. Basic tiles 1300*a* and 1300*b* are comprised in a chain of basic tiles, where basic tile 1300*b* follows basic tile 1300*a* immediately. The approximation unit 200 connects basic tile 1300*b* with the current end, i.e. tile 1300*a*, of the chain under construction. A basic tile is connected with another tile in one of two ways by the approximation unit 200 as shown in FIG. 13. In one way, three vertices C1, D1 and A1 of basic tile 1300*a* are coincide with vertices A2, B2 and D2 of the following basic tile 1300*b* respectively as is shown in the upper figure of FIG. 13. In the other way, three vertices C1, D1 and B1 of basic tile 1300*a* are coincide with vertices A2, B2 and C2 of the following basic tile 1300*b* respectively as is shown in the lower figure of FIG. 13.

Connecting tiles one by one in such a way, the approximation unit 200 generates a chain of basic tiles to imitate a part or all of the shape of the given object in a three-dimensional space.

A chain of basic tiles obtained in such a way explained above corresponds to a chain of divided-hyperface defined by a four-dimensional shape generated by the generation unit 210. For example, basic tile 1300*a* (resp. 1300*b*) in the upper figure of FIG. 13 corresponds to basic tile 1020*a* (resp. 1020*c*) in FIG. 12 which is a projection of a divided-hyperface. And basic tile 1300*a* (resp. 1300*b*) in the lower figure of FIG. 13 corresponds to basic tile 1020*a* (resp. 1020*b*) in FIG. 12.

Using the two types of connections shown in FIG. 13, the approximation unit 200 generates a chain of basic tiles to imitate the shape of the given object.

And the generation unit 210 generates a chain of divided-hyperfaces which corresponds to the chain of basic tiles conveyed from the approximation unit 200. Then the generation unit 210 stores a four-dimensional shape which corresponds to the chain of divided-hyperfaces. The stored shape is administered by the administration unit 220.

Moreover, the generation unit 200 may encode a chain of basic tiles by assigning a value 0 or 1 to each basic tile, where an assigned value denotes the way the corresponding basic tile is connected with the following basic tile. (As explained above, there are two ways of connection.)

Figures 14, 15:
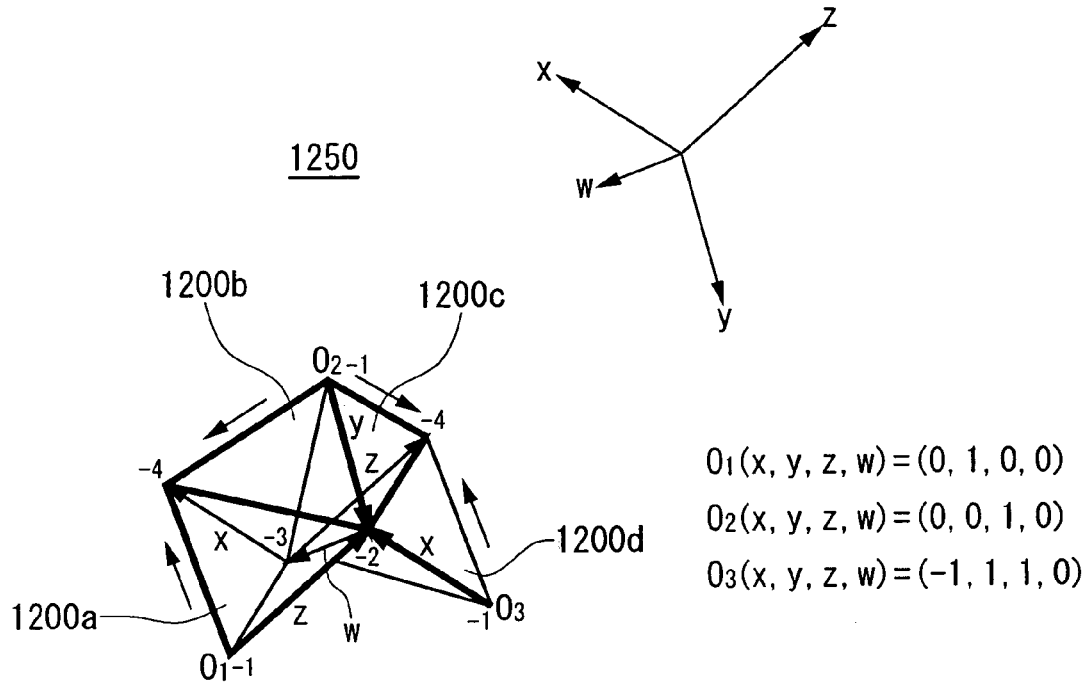
FIG. 14 shows an example of a chain of basic tiles used in the second embodiment.
FIG. 15 shows an example of a set of vertices in the vertex-table of the administration-table-set 230 used in the second embodiment.

FIG. 14 shows an example 1250 of a chain of basic tiles used in the second embodiment. Chain 1250 consists of four basic tiles 1200*a*, 1200*b*, 1200*c* and 1200*d*.

Basic tile 1200*a* is the initial tile of chain 1250. Recall that basic tile 1200*a* is a projection of a divided-hyperface of a basic block with reference vertex O1 into a three-dimensional space. That is, basic block 1200*a* is a tetrahedron defined by projected images of four vertices O1, O1+ex, O1+ez+ew and O1+ez+ew+ex, where ex, ez and ew are the unit vectors used to define a basic block in a four-dimensional space.

Suppose that a, b, c and d are integers. In the second embodiment, we denote a point in a four-dimensional space defined as the end point of vector a*ex+b*ey+c*ez+d*ew and denotes it by 4-tuple (a, b, c, d). And let the coordinate of 01 be (0,1,0,0).

Recall that, as is shown in the lower figure of FIG. 12, a lattice point is higher than lattice points which are obtained by translation of the lattice point along ex, ey, ez or ew. Now we introduce a notion of "height" of lattice points. A height is defined in such a way that the difference of height of points P and P+ex (or P+ey or P+ez or P+ew) is 1. For example, we can define a height of point (a, b, c, d) by a+b+c+d. In the followings we use this height function. Further, we consider height of the projected image of (a, b, c, d) into a three-dimensional space and also call value a+b+c+d the "height" of the image of (a, b, c, d) in a three-dimensional space.

As explained above, basic tile 1200*a* is a projection of a divided-hyperface of a basic block with reference vertex O1 into a three-dimensional space, where the divided-hyperface is specified by three vectors ez, ew and ex. And the height of four vertices O1, O1+ex, O1+ez+ew and O1+ez+ew+ex are −1, −2, −3 and −4 respectively.

Basic tile 1200*b* is connected with basic tile 1200*a*. Basic tile 1200*b* is a projection of a divided-hyperface of a basic block with reference vertex O2 into a three-dimensional space, where the divided-hyperface is specified by three vectors ey, ew and ex. That is, basic block 1200*b* is a tetrahedron defined by the projection of four vertices O2, O2+ey, O2+ey+ew and O2+ey+ew+ex. And the height of four vertices O2, O2+ey, O2+ey+ew and O2+ey+ew+ex are −1, −2, −3 and −4 respectively.

Basic tile 1200*c* is connected with basic tile 1200*b*. Basic tile 1200*c* is a projection of a divided-hyperface of a basic block with reference vertex O2 into a three-dimensional space, where the divided-hyperface is specified by three vectors ey, ew and ez. That is, basic block 1200*c* is a tetrahedron defined by the projection of four vertices O2, O2+ey, O2+ey+ew and O2+ey+ew+ez. And the height of four vertices O2, O2+ey, O2+ey+ew and O2+ey+ew+ez are −1, −2, −3 and −4 respectively.

Basic tile 1200*d* is connected with basic tile 1200*c*. Basic tile 1200*d* is a projection of a divided-hyperface of a basic block with reference vertex O3 into a three-dimensional space, where the divided-hyperface is specified by three vectors ex, ew and ez. That is, basic block 1200*d* is a tetrahedron defined by the projection of four vertices O3, O3+ex, O3+ex+ew and O3+ex+ew+ez. And the height of four vertices O3, O3+ex, O3+ex+ew and O3+ex+ew+ez are −1, −2, −3 and −4 respectively.

In the second embodiment, the generation unit 210 assigns symbols to chain 1250 of basic tiles using the height function. In details, the unit generation 210 assigns symbol "U" to a basic tile if the height of the vertex of the basic tile which is not contained in the succeeding basic tile is smaller than heights of three vertices which are shared between the basic tile and the succeeding basic tile. If not, the generation unit 210 assigns symbol "D" to the basic tile. For example, the height of point O1, whose projection is a vertex of basic tile 1200*a*, is larger than the heights of points that corresponds to the contact face between basic tiles 1200*a* and 1200*b*. Thai is, −1 >−2, −3, −4. Thus the generation unit 210 assigns symbol "D" to basic tile 1200*a*. In the case of basic tile 1200*b*, the height of the vertex of basic tile 1200*b* which is not contained in the succeeding basic tile 1200*c* is −4. On the other hand, point O2 is the highest among three points which correspond to the contact face between basic tiles 1200*b* and 1200*c* and the height of O2 is −1. Since −4<−1, the generation unit 210 assigns symbol "U" to basic tile 1200*b*. Continuing the process, the generation unit 210 assigns code "DUDU" to chain 1250 of basic tiles.

FIG. 15 shows an example of a set of vertices in the vertex-table of the administration-table-set 230 used in the second embodiment. An entry of the vertex-table of the administration-table-set 230 consists of an ID-of-shape field and a coordinates-of-vertex filed.

An ID-of-shape field contains an identifier of the corresponding shape stored in the administration-table-set 230. In FIG. 15 the identifier of chain 1250 of basic tiles is 003.

A coordinates-of-vertex field contains the cartesian coordinates in four dimensions of a peak of the corresponding four-dimensional shape.

The administration unit 220 administers four-dimensional shapes which correspond to the shape of a three-dimensional object using data of peaks of the four-dimensional shapes in the vertex-table.

Figure 16:
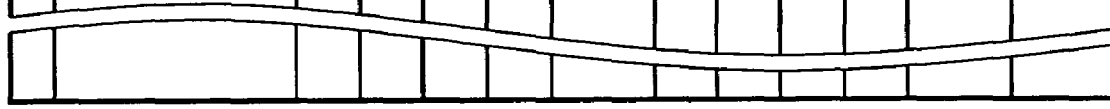
FIG. 16 shows an example of a set of vertices in the shape-table of the administration-table-set 230 used in the second embodiment.

FIG. 16 shows an example of a set of vertices in the shape-table of the administration-table-set 230 used in the second embodiment.

An entry of the shape-table of the administration-table-set 230 consists of an ID-of-shape field, an initial-tile field, a terminal-tile field and a code field.

An ID-of-shape field contains an identifier of the corresponding shape stored in the administration-table-set 230. In FIG. 16, the identifier of chain 1250 of basic tiles is 003.

An initial-tile field contains the data of the initial divided-hyperface of the corresponding chain of divided-hyperfaces. In the FIG. 16, the initial divided-hyperface of chain 1250 is specified by reference vertex O1=(0, 1, 0, 0). Vertices of the initial divided-hyperface are O1, O1+ez, O1+ez+ew and O1+ez+ew+ex. (Recall that ex, ey and ez are the vectors used to define basic blocks.) And the initial basic tile 1200*a* is the projected image of the initial divided-hyperface.

A terminal-tile field contains the data of the terminal divided-hyperface of the corresponding chain of divided-hyperfaces. In FIG. 16, the terminal divided-face of chain 1250 is specified by reference vertex O3=(−1, 1, 1, 0). Vertices of the terminal divided-hyperface are O3, O3+ex, O3+ex+ew and O3+ex+ew+ez. And the terminal basic tile 1200*d* is the projection of the terminal divided-hyperface.

A code field contains the code of the corresponding chain of divided-hyperfaces.

The administration unit 220 administers the chain of divided-hyperfaces which corresponds to the shape of a three-dimensional object using data of the initial tile, the terminal tile and the code (of the chain of divided-hyperfaces) in the shape-table.

Figure 17:
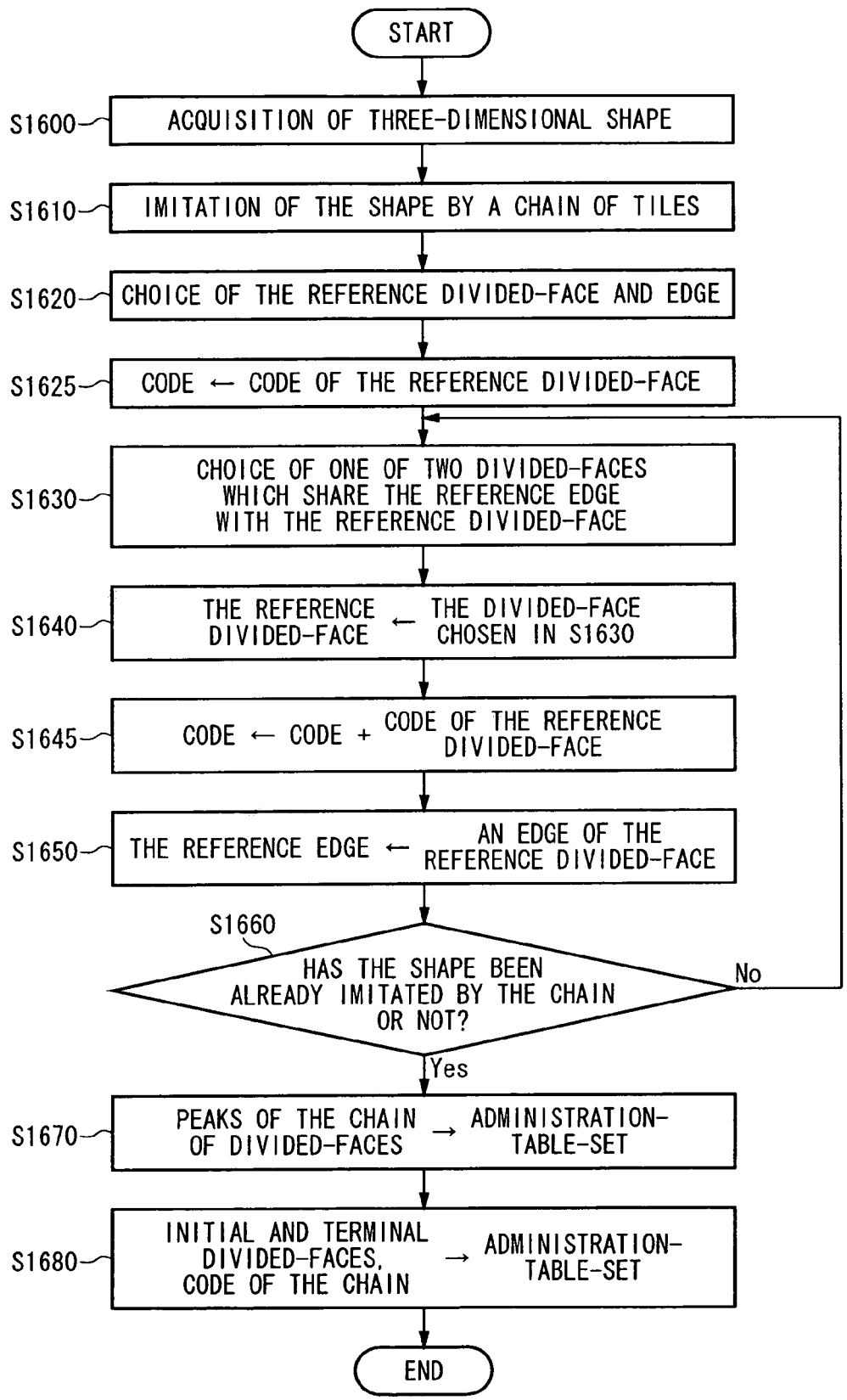
FIG. 17 shows the procedure performed by the shape processing unit 120 for the second embodiment of the present invention.

FIG. 17 shows the procedure performed by the shape processing unit 120 for the second embodiment of the present invention. As explained bellow, the flow chart in FIG. 17 illustrates the procedure to transform the shape of an object into the data format of the administration-table-set 230 and generate the code of the shape of the given object.

First, the approximation unit 200 receives the shape of an object in a three-dimensional space from the input unit 110 (S1600). And the approximation unit 200 generates a chain of basic tiles to imitate the shape of the given object (S1610).

Next, the generation unit 210 chooses one of six divided-hyperfaces of a basic tile of the chain as the initial reference divided-hyperface and one of two faces of the reference divided-hyperface which are not the division face (that is, which are also faces of the corresponding basic block,) as the reference face (S1620). And the generation unit 210 assigns a symbol of code, which reflects the shape of the given object, to the initial reference divided-hyperface as the initial symbol of the code of the object (S1625). In this embodiment, where the height of lattice point (a, b, c, d) is defined by a+b+c+d, the generation unit 210 assigns symbol "0" (or "D") to the reference divided-hyperface when the reference face corresponds the lower side of the reference divided-hyperface and "1" (or "U") when the reference face corresponds the upper side of the reference divided-hyperface.

Next, the generation unit 210 chooses one of two divided-hyperfaces which share the reference face with the reference divided-hyperface and whose image by the projection into the predetermined hyperface in a four-dimensional space do not overlap with the image of the reference divided-hyperface by the same projection (S1630). The generation unit 210 chooses the divided-hyperface in such a way that the projection of the chosen divided-hyperface imitates a part or all of the shape of the given object. In this embodiment, the image of a divided-hyperface by the projection overlaps with the image of another divided-hyperface when both of the divided-hyperface correspond to the same basic tile in the predetermined hyperface in a four-dimensional space.

Next, the generation unit 210 chooses the divided-hyperface chosen in the step of S1630 as the new reference divided-hyperface (S1640). And the generation unit 210 appends a symbol "0" (or "D") or "1" (or "U") to the right end of the code as the symbol which corresponds to the new reference divided-hyperface (S1645).

Next, the generation unit 210 chooses the face of the new reference divided-face that is not the division face and not chosen in the step of S1630 as the new reference edge (S1650).

The generation unit 210 executes the steps of S1630, S1640, S1645 and S1650 repeatedly until the shape of the given object is fully imitated by the obtained chain of divided-hyperfaces (S1660).

Finally, the generation unit 210 transforms the obtained chain of divided-hyperfaces into a four-dimensional shape and stores all peaks of the four-dimensional shape in the vertex-table of the administration-table-set 230 (S1670). The generation unit 210 also stores the initial and terminal divided-hyperface of the chain and the code obtained by the above procedure in the shape-table of the administration-table-set 230 (S1680).

As explained above, the generation unit generates a chain of divided-hyperfaces by repeated executions of steps S1630, S1640, S1645 and S1650. And the shape of the given object is imitated by the three-dimensional shape obtained by projecting the chain of divided-hyperfaces into the predetermined hyperface in a four-dimensional space.

The generation unit 210 also generates the corresponding four-dimensional shape by assigning basic blocks which include one of the divided-hyperfaces of the chain to basic spaces.

Recall that, for each point of the four-dimensional lattice, there exists a (four-dimensional) basic block whose reference vertex is given by the point and it defines a four-dimensional version of square pyramid whose peak (top vertex) is the reference vertex and the four (three-dimensional) slopes are defined by the predetermined four (three-dimensional) faces of the basic block (1010d in FIG. 12). (In particular, the height of the pyramid is infinite.)

The generation unit 210 generates a four-dimensional shape by assigning all basic blocks which are covered by a set of four-dimensional square pyramids. Thus the four-dimensional shape generated in the above procedure is specified by peaks of all four-dimensional square pyramids.

And the administration unit 220 stores peaks of all four-dimensional square pyramids in the administration-table-set 230 and uses the peaks to administer the four-dimensional shape.

Moreover the generation unit 210 may encode the shape of the given object by assigning either value 0 or 1 to each divided-hyperfaces of the chain in the step of S1645. The choice of a value reflects the choice of the corresponding divided-hyperface in the step.

Figure 18:
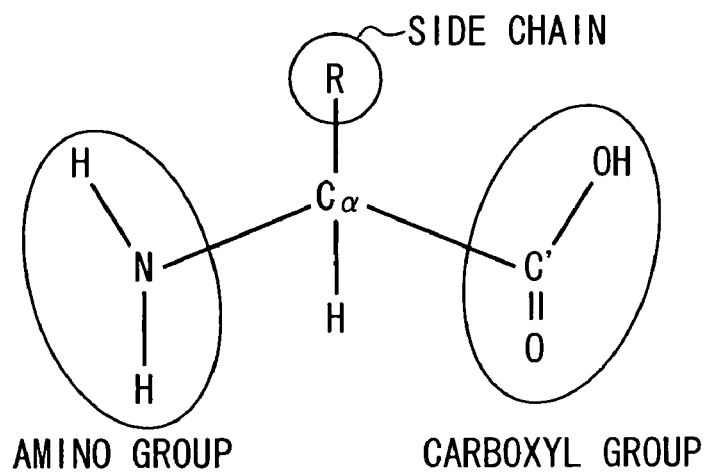
FIG. 18 is an outline of the structure of an amino-acid and a protein (polypeptide)
Figure 18:
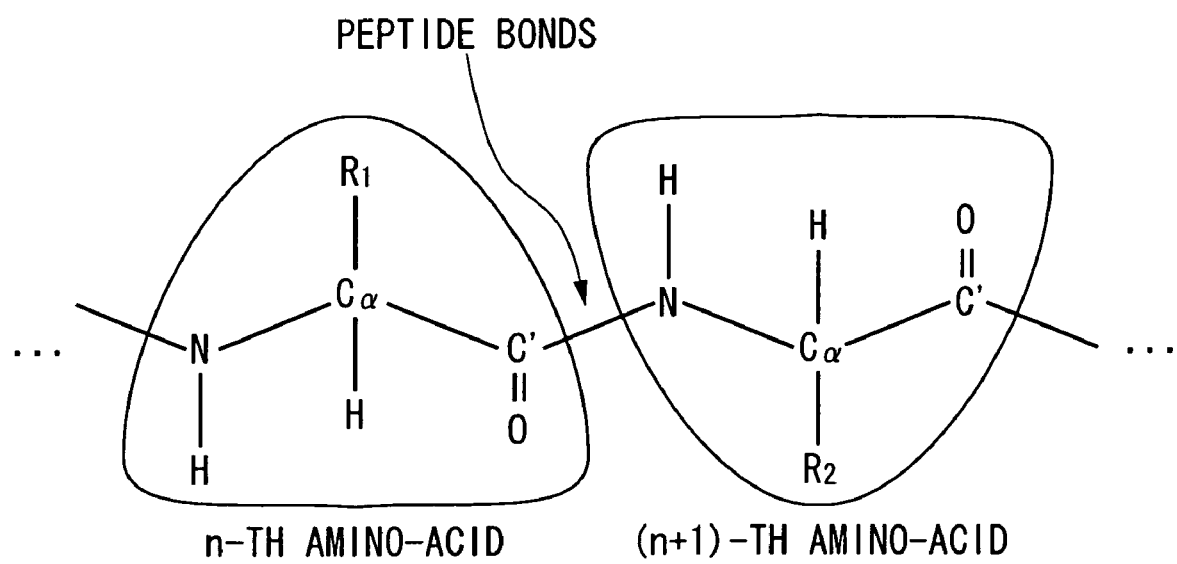

FIG. 18 is an outline of the structure of an amino-acid and a protein (i.e. polypeptide).

The upper figure of FIG. 18 shows an outline of the structure of an amino-acid. An amino-acid has a tetrahedral (sp3) carbon atom (Cα) to which four asymmetric groups are connected: an amino group (NH2), a carboxyl group (COOH), a hydrogen atom (H) and another chemical group (denoted by R). The chemical group R varies from one amino-acid to another.

The lower figure of FIG. 18 shows an outline of the structure of a protein (polypeptide).

Protein is a polymer of amino-acids linked by peptide bonds. The peptide bond is formed between the amino group of the (n+1)-th amino-acid and the carboxyl group of the n-th amino-acids.

The shape processing unit 120 for the second embodiment of the present invention receives a polymer such as protein as an object in a three-dimensional space and generates a chain of tiles to imitate the shape of the polymer. For example, the approximation unit 200 assigns a basic tile to each monomer (A monomer is a repeating subunit of a polymer. In this case, monomers correspond to Ns and Cs of amino-acids.). And the approximation unit 200 imitate the shape of the polymer in such a way that the position of a monomer (or N or C) corresponds to the center of the corresponding tile.

When the polymer received is a protein, the approximation unit 200 assigns consecutive three basic tiles to one amino-acid of the protein. That is, the first basic tile for N of the amino group (NH2), the second tile for Cα and the third basic tile for C of the carboxyl group (COOH).

FIG. 19 shows a code of a hormone (insulin, human) encoded by the shape processing unit 120 which embodies the second embodiment. The left column of the table shows the chain of amino-acids of the hormone and the right column shows the code of the chain of basic tiles which corresponds to the hormone.

As you see in FIG. 19, the hormone (insulin, human) consists of twenty-one amino-acids. In the table each amino-acids is denoted by abbreviations. For example, glycine is abbreviated to "GLY", isoleucine to "ILE", valine to "VAL", glutamic acid to "GLU", glutamine to "GLN", cysteine to "CYS", threonine to "THR", serine to "SER", leucine to "LEU", tyrosice to "TYR" and asparagine to "ASN".

Each bond between consecutive two amino-acids of the left column is imitated by a chain of three basic tiles whose code is given in the right column. For example, as shown in the first and second low of the table, the bond between GLY and ILE is imitated by a chain of three tiles whose code is "DUD". The chain has the same structure as chain 1250 of basic tiles in FIG. 13.

Figure 20:
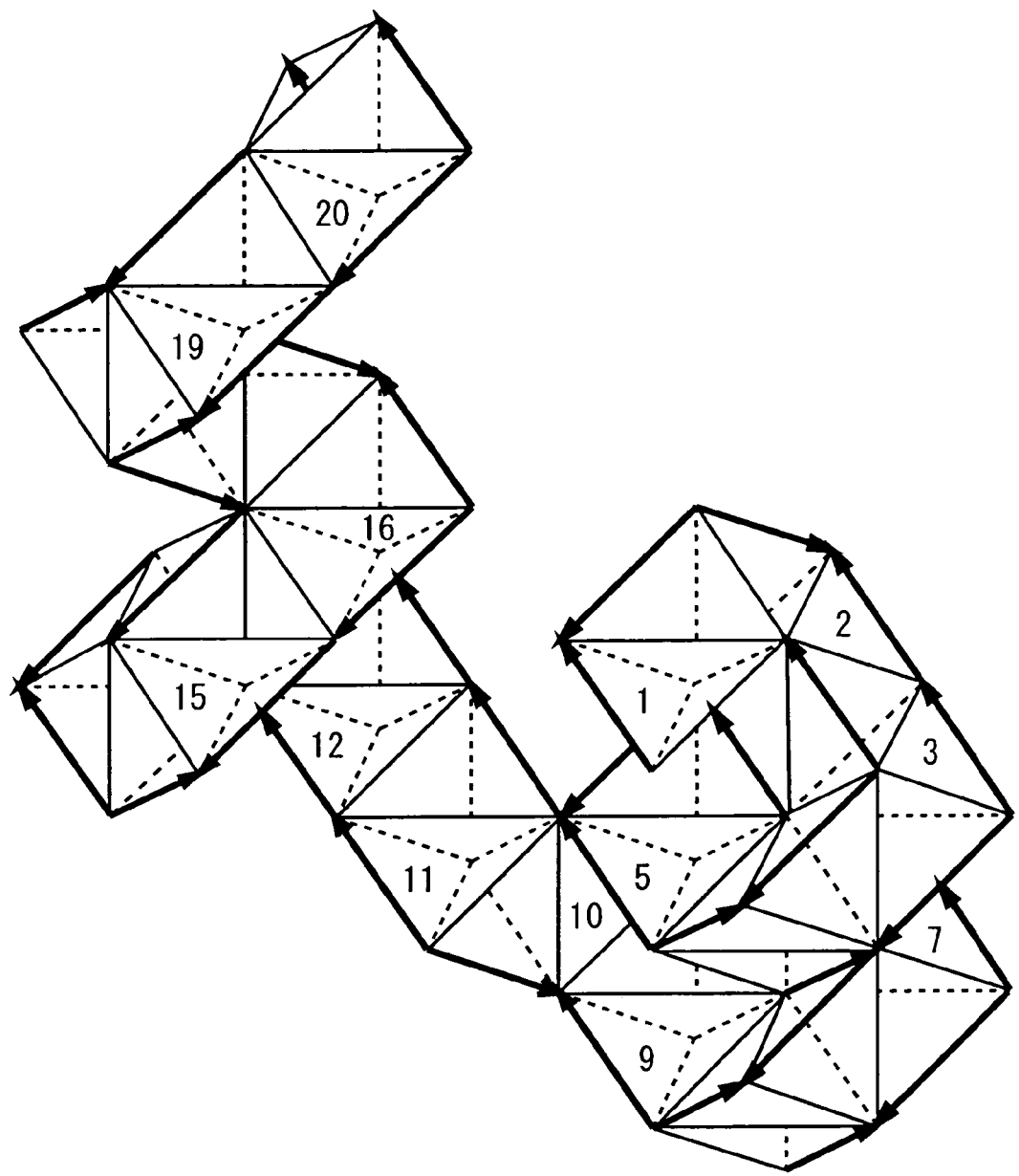
FIG. 20 shows a three-dimensional shape which imitates the shape of a hormone (insulin, human) and is generated by the shape processing unit 120 which embodies the second embodiment.

FIG. 20 shows a three-dimensional shape which imitates the shape of a hormone (insulin, human) and is generated by the shape processing unit 120 which embodies the second embodiment. The numbers on the basic tiles in FIG. 20 shows the entry number of the corresponding amino-acids in the table of FIG. 19 (numbers on the left). The shape processing unit 120 imitates the hormone given in FIG. 19 by a chain of basic tiles given in FIG. 20 and store the data of the chain.

As explained above, the generation unit 210 generates a chain of basic tiles to imitates a part or all of the structure of a protein. The shape of the basic tile is a kind of tetrahedron, that is, a three-dimensional shape with four vertices. Starting from the initial tile, the chain of basic tiles is generated by connecting a basic tile with the following tile by an face one by one.

Figure 21:
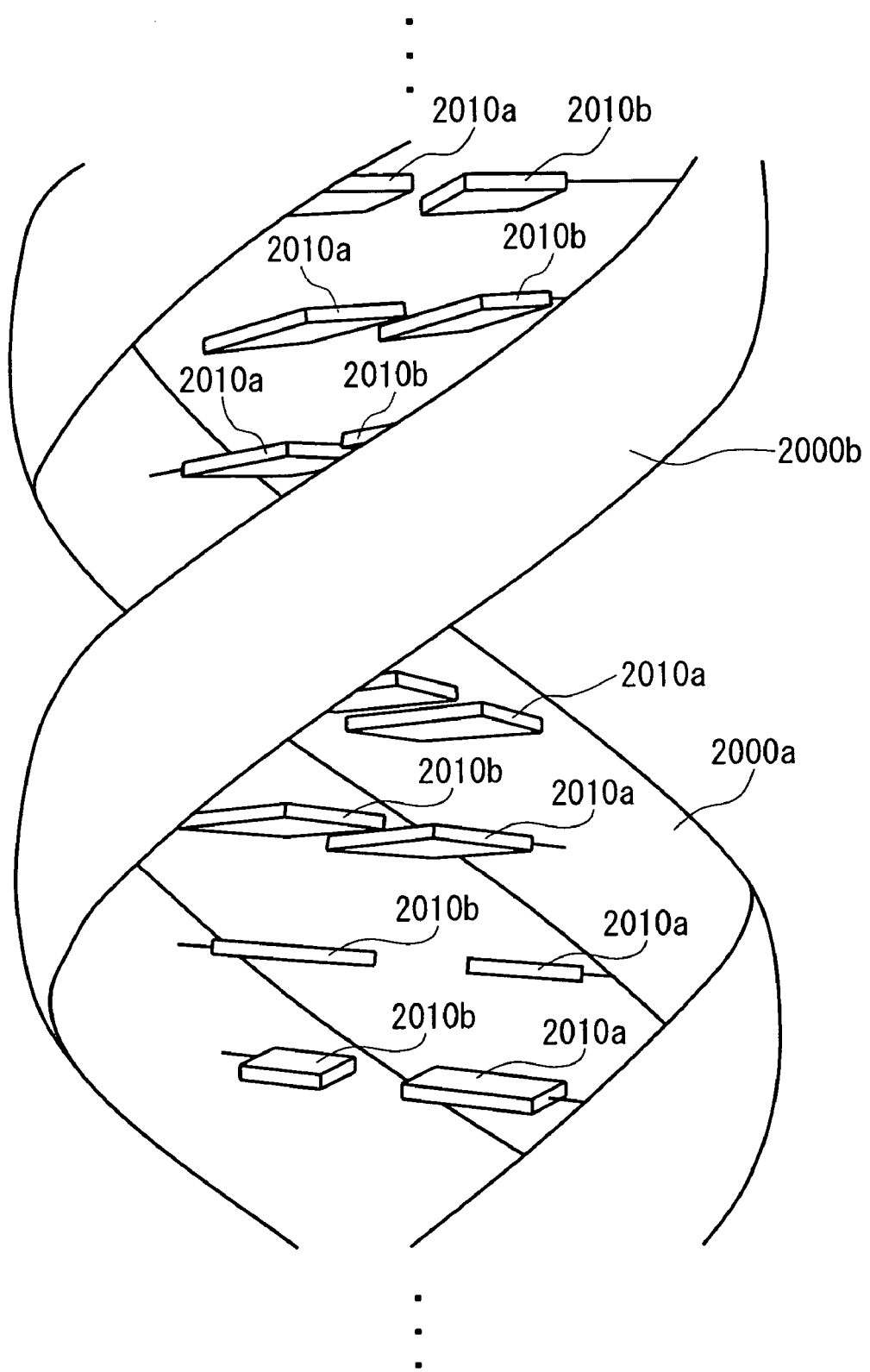
FIG. 21 is an outline of the structure of a DNA molecule.

FIG. 21 is an outline of the structure of a DNA molecule.

A DNA molecule consists of two sugar-phosphate backbones 2000a and 2000b and a lot of base pairs of 2010a and 2010b.

Two sugar-phosphate backbones 2000a and 2000b are a schematic drawing of the double helix of DNA. And each nucleotide base 2010a (resp. 2010b) are connected to sugar-phosphate backbone 2000a (resp. 200b). And each pair of 2010a and 2010b forms a base pair (by hydrogen bonding).

Figure 22:
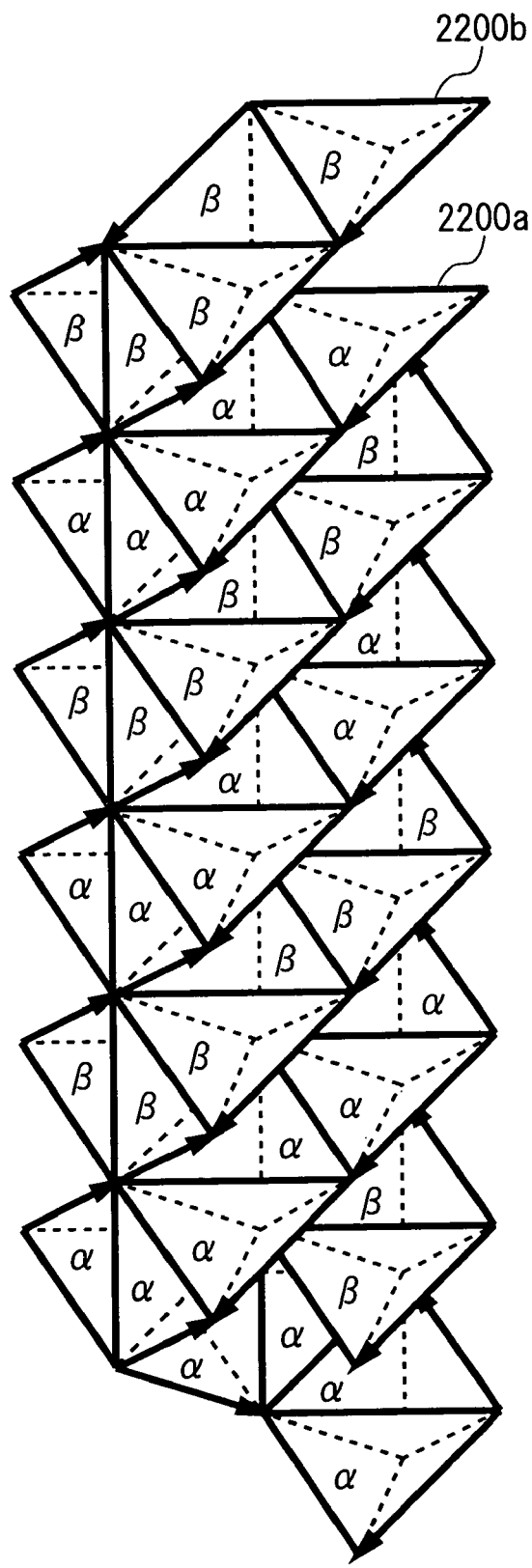
FIG. 22 shows a three-dimensional shape which imitates the shape of a DNA molecule and is generated by the shape processing unit 120 which embodies the second embodiment.

FIG. 22 shows a three-dimensional shape which imitates the shape of a DNA molecule and is generated by the shape processing unit 120 which embodies the second embodiment.

The structure of the three-dimensional shape is a double helix composed of two chains 2200a and 2200b of basic tiles. Chain 2200a imitates sugar-phosphate backbones 2000a, where one basic tile α corresponds to one nucleotide base 2010a. And chain 2200b imitates sugar-phosphate backbones 2000b, where one basic tile β corresponds to one nucleotide base 2010b. The shape processing unit 120 imitates the DNA molecule in FIG. 21 by a chain of basic tiles in FIG. 22 and store the chain.

As explained above, the generation unit 210 generates a chain of basic tiles to imitate a part or all of the structure of a DNA molecule. The shape of the basic tile is a kind of tetrahedron, that is, a three-dimensional shape with four vertices. Starting from the initial tile, the chain of basic tiles is generated by connecting a basic tile with the following tile by a face one by one.

As shown in FIG. 20 and FIG. 22, the shape processing unit 120 can imitates a polymer using a chain of basic tiles, where a monomer or a set of monomer corresponds to a basic tile or a set of basic tiles. And the shape processing unit 120 stores the obtained chain of basic tiles.

As explained above, the generation unit 210 generates a three-dimensional shape from a chain of basic tiles assigning basic blocks 300 to the corresponding basic space. The assignment is done in such a way that the chain of basic tiles corresponds to a part or all of the projection of divided-faces of the assigned basic blocks. (Recall that each basic block 300 has six divided-faces that are obtained by dividing three faces of the basic block by division lines 320a, 320b and 320c.)

And the generation unit 210 generates a three-dimensional shape from a chain of basic tiles in such a way that each pair of consecutive basic tiles of the chain corresponds to two divided-faces of one basic block or two consecutive basic blocks. The generated three-dimensional shape imitates the shape of the given object.

As is shown above, the shape processing unit 120 according to the second embodiment transforms the shape of an object into a chain of basic tiles. And the shape processing unit 120 stores a set of peaks of a four-dimensional shape which corresponds to the chain of basic tiles as data of the shape.

In this way, the shape processing unit 120 can store various kind of shapes which are imitated by a number of basic tiles. (Actually, it stores the corresponding lattice points in a four-dimensional space.) Therefore, by using the shape processing unit 120 according to the second embodiment, one can save memory of a computer when he/she stores shapes of objects. Moreover one can rotate or/and translate the shape of an object with less amount of calculation.

Furthermore, the shape processing unit 120 can encode the shape of an object assigning a symbol (either "0" or "1") to each divided-hyperface of the chain which corresponds to the chain of basic tiles obtained from the shape of the given object. In this way the shape processing unit 120 can encode any shape which is imitated by a number of basic tiles using only 1 bit for each basic tile. Thus, using the shape processing unit 120, one needs less memory when he/she store the shape of an object.

Giving a polymer to the shape processing unit 120 as an input, one obtains a chain of basic tiles which imitates the three-dimensional structure of the polymer.

Lastly, the shape processing unit 120 can perform various kind of three-dimensional transformations such as rotation, translation, enlargement, reduction, composition or decomposition over some objects using the four-dimensional data in the administration-table-set 230.

The Third Embodiment of the Present Invention

Figure 23:
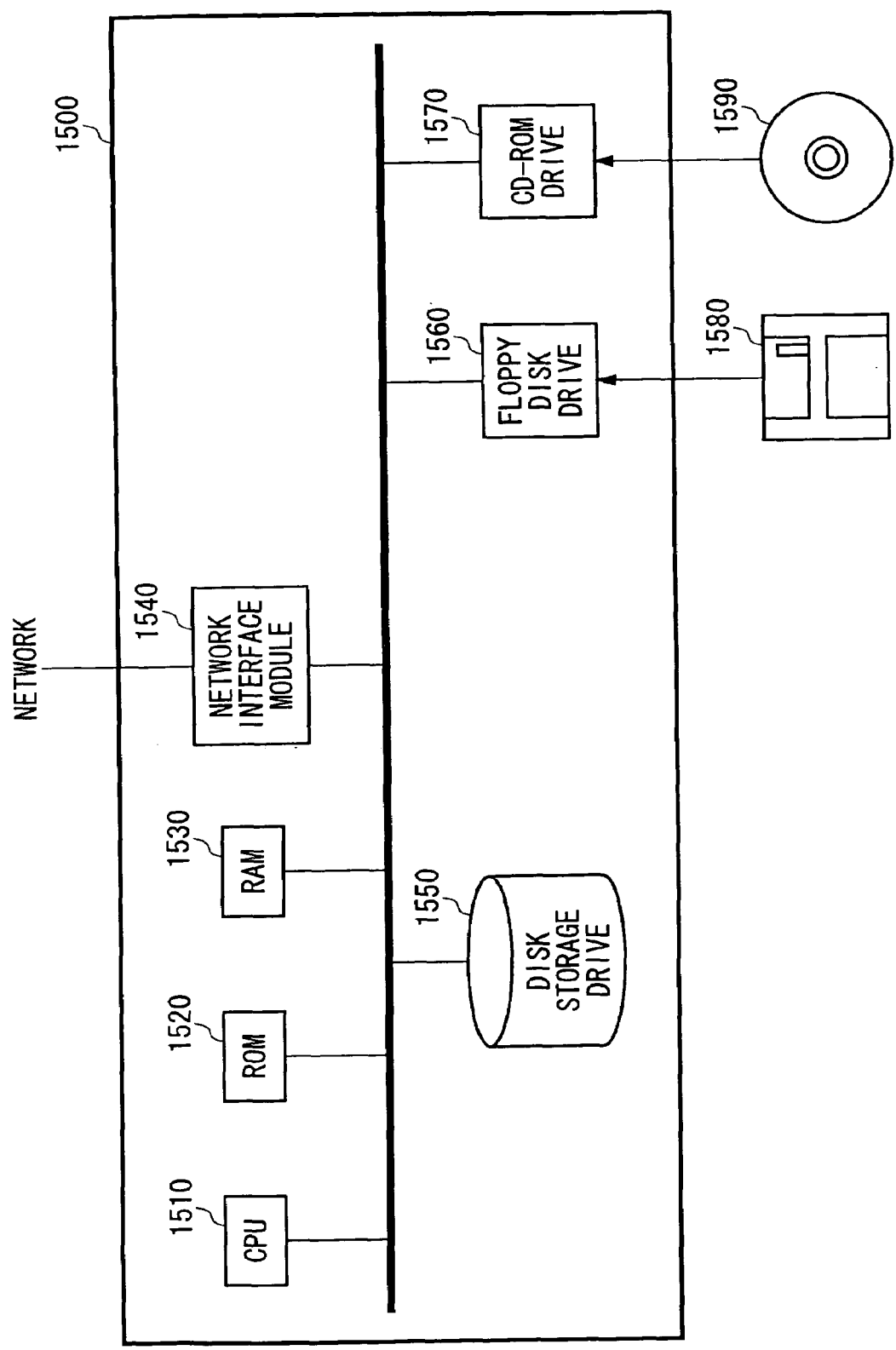
FIG. 23 shows hardware components of the shape processing unit 120 according to the first embodiment.

FIG. 23 shows hardware components of the shape processing unit 120 according to the first embodiment. CPU 1510, ROM 1520, RAM 1530, network interface module 1540 and disk storage drive 1550 comprise a computer system 1500. And computer system 1500 executes software programs to perform the shape processing due to the shape processing unit 120. The computer system 1500 may also equipped with floppy disk drive 1560 and/or CD-ROM drive 1570.

The program which implements the shape processing unit 120 consists of an approximation module, a generation module, an administration module, a processing module, a reproduction module and an output module. These modules execute the functions of the approximation unit 200, the generation unit 210, the administration 220, the processing unit 240, the reproduction unit 250 and the output unit 260 of the first or second embodiments respectively. The administration-table-set 230 is stored in a disk storage by disk storage drive 1550.

The program or modules explained above may be stored in an external storage device. For example, one can uses optical storage devices such as DVD and PD, opt-magnetic storage devices such as MD, tape cassettes or even IC cards for the purpose.

Moreover, one can use remote storage devices via network such as Internet and downloads the program to computer system 1500.

Although the present invention has been described by way of exemplary embodiment, the scope of the present invention is not limited to the foregoing embodiment. Various modifications in the foregoing embodiment may be made when the present invention defined in the appended claims is enforced. It is obvious from the definition of the appended claims that embodiments with such modifications also belong to the scope of the present invention.

INDUSTRIAL APPLICABILITY

It is apparent from the foregoing description that the invention provides us a shape processor and a method for representing shape that is capable of processing shapes of objects which include polymers such as proteins with less amount of calculation and also capable of storing shapes with less amount of memory.

(A polymer is a large molecule made of repeating subunits linked by covalent bonds, such as polypeptide chains.)

What is claimed is:

1. A shape processor for imitating a shape of an object in a two-dimensional space, comprising:

an approximation unit operable to generate a chain of basic tiles that imitates the shape of the object by connecting a basic tile with a following tile by an edge one by one from an initial tile, wherein each basic tile is chosen from a predetermined set of basic tiles generated by projecting an image of three faces of each convex hull of a lattice of convex hulls from a three-dimensional space onto the two-dimensional space, wherein each face is further divided by a division line that intersects with two vertices including a reference vertex of the convex hull that is shared by the three faces and a vertex of the face that is not connected to the reference vertex by an edge, such that the projected image of the faces are also divided; and a generation unit operable to generate a three-dimensional shape by specifying whether a set of one or more basic blocks is assigned to each convex hull of the lattice of convex hulls and corresponds a part or all of a chain of divided faces obtained by projecting the assigned basic blocks with the chain of basic tiles.

2. The shape processor as recited in claim 1, wherein the generation unit chooses a set of points at the vertices of convex hulls of the lattice of convex hulls to generate a three-dimensional shape by assigning basic blocks to all of the convex hulls that correspond to triangular pyramids formed at the chosen points of the lattice by three faces of the convex hulls located at those vertices, and the generation unit further comprises an administration unit operable to store the generated shape as a set of points.

3. A shape processor for imitating a shape of an object in a two-dimensional space, comprising a generation unit operable to generate a three-dimensional shape defined by designating whether basic blocks assignable to a convex hull surrounded by eight points of a lattice in a three-dimensional space is to be assigned to a corresponding space convex hull, so that a two-dimensional shape, which is defined by projecting three faces of the basic blocks constituting the three-dimensional shape onto a plane, imitates the shape of the object, wherein each face of the basic blocks is divided into two divided faces by a division line connecting a reference vertex and a vertex positioned diagonally with respect to the reference vertex, wherein the reference vertex is a vertex of the basic block shared by the three faces of the basic block, such that each divided face comprises two edges that overlap two edges of the basic block and a division edge that overlaps with the division line, the generation unit executes:

a first step of choosing one of the divided-faces of a basic block as an initial reference divided-face and two edges of the initial reference divided-face that are edges of the corresponding basic block as reference edges;

a second step of choosing one of the two divided-faces that share a reference edge with the reference divided-face and whose projected image does not overlap with the projected image of the reference divided-face, wherein the generation unit chooses the divided-face in such a way that the projected image of the chosen divided-face imitates a part or all of the shape of the object;

a third step of choosing the divided-face chosen in the second step as a new reference divided-face; and a fourth step of choosing another edge of the new reference divided-face that is not a division edge as the new reference edge, and repeating the second, third, and fourth steps until a chain of divided-faces that were chosen as reference divided-faces is obtained, and the two-dimensional shape obtained by projecting the chain of divided-faces into the predetermined plane imitates the shape of the object, and a final step of generating a three-dimensional shape by assigning basic blocks that contain one of the divided-faces of the chain of divided-faces to corresponding convex hulls.

4. The shape processor as recited in claim 3, wherein the generation unit encodes the generated shape by assigning a value of 0 or 1 to each divided-faces of the chain of divided-faces according to the choices made in the second step.

5. A shape processor for imitating a shape of an object in a three-dimensional space, comprising:

an approximation unit operable to generate a chain of basic tiles that imitates the shape of the object by connecting a basic tile with a following tile by a face one by one from an initial tile, wherein each basic tile is chosen from a predetermined set of basic tiles generated by projecting an image of four hyperfaces of each convex hull of a lattice of convex hulls from a four-dimensional space onto the three-dimensional space, wherein each hyperface is further divided by a division plane that intersects with three vertices including a reference vertex of the convex hull that is shared by the four hyperfaces, a vertex positioned opposite from the reference vertex on the hyperface, and another vertex on the hyperface; and a generation unit operable to generate a four-dimensional shape by specifying whether a set of one or more basic blocks is assigned to each convex hull of the lattice of convex hulls and corresponds a part or all of a chain of divided hyperfaces obtained by projecting the assigned basic blocks with the chain of basic tiles.

6. The shape processor as recited in claim 5, wherein the generation unit chooses a set of points at the vertices of convex hulls of the lattice of convex hulls to generate a four-dimensional shape by assigning basic blocks to all of the convex hulls that correspond to pyramids formed at the chosen points of the lattice by four hyperfaces of the convex hulls located at those vertices, and the generation unit further comprises an administration unit operable to store the generated shape as a set of points.

7. A shape processor for imitating a shape of an object in a three-dimensional space, comprising a generation unit operable to generate a four-dimensional shape defined by designating whether basic blocks assignable to a convex hull surrounded by sixteen points of a lattice in a four-dimensional space is to be assigned to a corresponding convex hull, so that a three-dimensional shape, which is defined by projecting four hyperfaces of the basic blocks constituting the four-dimensional shape onto a three-dimensional space, imitates the shape of the object, wherein each hyperface of the basic blocks is divided into six divided hyperfaces by a division plane, which is a plane that intersects with three vertices including a reference vertex that is a vertex shared by the four hyperfaces of the basic block projected into the projection direction, a vertex located opposite from the reference vertex on the hyperfaces, and another vertex on the hyperface, the generation unit executes:

a first step of choosing one of the divided-hyperfaces of a basic block as an initial reference divided-hyperface and two faces of the initial reference divided-hyperface that are faces of the corresponding basic block as reference faces;

a second step of choosing one of the two divided-hyperfaces that share a reference face with the reference divided-hyperface and whose projected image does not overlap with the image of the reference divided-hyperface, wherein the generation unit chooses the divided-hyperface in such a way that the projected image of the chosen divided-hyperface imitates a part or all of the shape of the object;

a third step of choosing the divided-hyperface chosen in the second step as a new reference divided-hyperface; and a fourth step of choosing another face of the new reference divided-hyperface that is not a division plane as the new reference face, and repeating the second, third, and fourth steps until a chain of divided-hyperfaces that were chosen as reference divided-hyperfaces is obtained, and the three-dimensional shape obtained by projecting the chain of divided hyperfaces into the predetermined three-dimensional space imitates the shape of the object, and a final step of generating a four-dimensional shape by assigning basic blocks that contains one of the divided-hyperfaces of the chain of divided hyperfaces to corresponding convex hulls.

8. The shape processor as recited in claim 7, wherein the generation unit encodes the generated shape by assigning a value of 0 or 1 to each divided-faces of the chain of divided hyperfaces according to the choices made in the second step.

9. A shape processor for imitating a structure of a polymer in a three-dimensional space, comprising an approximation unit operable to generate a chain of basic tiles to imitate a part or all of a structure of a polymer, wherein each basic tile is a kind of tetrahedron, that is, a three-dimensional shape with four vertices, and the chain of basic tiles is generated by connecting a basic tile with a following tile by a face one by one from a initial tile; and each basic tile is chosen from a predetermined set of basic tiles generated by projecting an image of four hyperfaces of each convex hull of a lattice of convex hulls from a four-dimensional space onto the three-dimensional space, wherein each hyperface is further divided by a division plane that intersects with three vertices including a reference vertex of the convex hull that is shared by the four hyperfaces, a vertex positioned opposite from the reference vertex on the hyperface, and another vertex on the hyperface.

10. The shape processor as recited in claim 9, further comprising a generation unit operable to generate a four-dimensional shape defined by assigning one or more basic blocks to a corresponding basic space, wherein each basic space is a convex hull of sixteen points of a lattice in a four-dimensional space, each basic block comprises four hyperfaces projected into the three-dimensional space, each of the four hyperfaces of the basic block is divided into six divided hyperfaces by a division face, which is a face including a reference vertex shared by the four hyperface of the basic block, a vertex positioned opposite from the reference vertex on the hyperfaces, and another vertex on the hyperfaces, the generation unit corresponds a part or all of a chain of divided hyperfaces obtained by projecting the assigned basic blocks with the chain of basic tiles, assigns each of the basic blocks to the corresponding basic space, and generates the four-dimensional shape that corresponds to a part or all of the structure of the polymer so that two adjacent basic tiles in the basic tile chain corresponds a part or all of shape obtained by projecting the divided-hyperfaces of one basic block or two basic blocks in the four-dimensional space into the three-dimensional space.

11. The shape processor as recited in claim 10, wherein the generation unit chooses a set of points of the lattice to generate a four-dimensional shape by assigning basic blocks to all of the basic spaces which correspond to four-dimensional version of square pyramids defined by the chosen points of the lattice, and the generation unit further comprises an administration unit operable to keep the generated shape as a set of points.

12. The shape processor as recited in claim 9, further comprising a generation unit operable to generate four-dimensional shape defined by designating whether each basic blocks assignable to each basic space surrounded by sixteen points of a lattice in a four-dimensional space is to be assigned to the corresponding basic space, so that a three-dimensional shape, which is defined by projecting the four-dimensional shape into a direction where four hyperfaces of the basic block consisting of the four-dimensional shape may be seen, imitates the chain of basic tiles, wherein each of the hyperfaces of the basic block is divided into six divided hyperfaces by a division surface, which is a surface including either of a reference vertex which is a vertex shared by the four hyperfaces of the basic block projected into the projection direction, a vertex located opposite from the reference vertex on the hyperfaces, or another vertex on the hyperface, the generation unit executes:

a first step of choosing one of the divided-hyperfaces of a basic block as the initial reference divided-hyperface and one of the two faces of the initial reference divided-hyperface that are faces of the corresponding basic block as the reference face;

a second step of choosing one of the two divided-hyperfaces which share the reference face with the reference divided-hyperface and whose image by the projection into the predetermined plane do not overlap with the image of the reference divided-hyperface by the same projection, wherein the generation unit chooses the divided-hyperface in such a way that the projection of the chosen divided-hyperface imitates a part or all of the structure of the polymer;

a third step of choosing the divided-hyperface chosen in the second step as the new reference divided-hyperface; and a fourth step of choosing the other face of the new reference divided-hyperface that is not the division line as the new reference face, a chain of the divided-hyperfaces that were chosen as reference divided-hyperfaces during the execution is obtained by executing the steps from the second step to the fourth step repeatedly, the three-dimensional shape obtained by the projection of the chain into the predetermined plane imitates a part or all of the structure of the polymer, and the generation unit generates a four-dimensional shape by assigning basic blocks that contains one of the divided-hyperfaces of the chain to their corresponding basic space.

13. The shape processor as recited in claim 12, wherein the generation unit encodes the structure of a polymer by assigning a value 0 or 1 to each divided-faces of the chain when one choose them in the second step.

14. The shape processor as recited in claim 9, wherein the basic tile comprises four vertices: A, B, C and D, the approximation unit generates a chain of basic tiles which imitates a part or all of the structure of the polymer by connecting a basic tile from the initial tile with the following tile sequentially such that either three vertices C, D and B of the basic tile are coincide with vertices A, B and C of the following basic tile respectively, or three vertices C, D and A of the basic tile are coincide with vertices A, B and D of the following basic tile respectively.

15. The shape processor as recited in claim 14, wherein the generation unit encodes a part or all of the structure of a polymer by assigning a value 0 or 1 to each basic tile of the chain which imitates the structure, where the assigned value denotes the way the basic tile is connected with the following basic tile.

16. The shape processor as recited in claim 9, wherein the polymer comprises a protein, and the generation unit imitates the structure of a chain of amino-acids which is a part or all of the protein, where one amino-acid corresponds to three consecutive basic tiles.

17. The shape processor as recited in claim 9, wherein the polymer comprises a DNA molecule, and the generation unit imitates the structure of a chain of nucleotides which is a part or all of the DNA molecule, where one nucleotides corresponds to one basic tile.

18. A method for representing a structure of a polymer in a three-dimensional space with a chain of basic tiles, wherein
   the basic tiles include a predetermined set of three-dimensional shapes, each of which is associated with four vertices A,B,C and D which form a tetrahedron, a part or all of the structure of the polymer is imitated by a chain of basic tiles which is generated by connecting a basic tile from an initial tile with a following tile by face sequentially; and
   each basic tile is chosen from a predetermined set of basic tiles generated by projecting an image of four hyperfaces of each convex hull of a lattice of convex hulls from a four-dimensional space onto the three-dimensional space, wherein each hyperface is further divided by a division plane that intersects with three vertices including a reference vertex of the convex hull that is shared by the four hyperfaces, a vertex positioned opposite from the reference vertex on the hyperface, and another vertex on the hyperface;
such that either
three vertices C, D and B of a basic tile are coincide with vertices A, B and C of the following basic tile respectively,
or
three vertices C, D and A of a basic tile are coincide with vertices A, B and D of the following basic tile respectively.

* * * * *